US012800810B2

(12) United States Patent
Yasui et al.

(10) Patent No.: US 12,800,810 B2
(45) Date of Patent: Nov. 17, 2026

(54) TRANSMISSION MEMBER

(71) Applicant: AGC Inc., Tokyo (JP)

(72) Inventors: Yoji Yasui, Tokyo (JP); Kenji Kitaoka, Tokyo (JP)

(73) Assignee: AGC Inc., Tokyo (JP)

( * ) Notice: Subject to any disclaimer, the term of this patent is extended or adjusted under 35 U.S.C. 154(b) by 215 days.

(21) Appl. No.: 18/907,314

(22) Filed: Oct. 4, 2024

(65) Prior Publication Data

US 2025/0028101 A1 Jan. 23, 2025

Related U.S. Application Data

(63) Continuation of application No. PCT/JP2023/014268, filed on Apr. 6, 2023.

(30) Foreign Application Priority Data

Apr. 8, 2022 (JP) ................................ 2022-064625

(51) Int. Cl.
*G02B 5/20* (2006.01)
*B60J 3/00* (2006.01)

(52) U.S. Cl.
CPC ............... *G02B 5/208* (2013.01); *B60J 3/007* (2013.01)

(58) Field of Classification Search
CPC .......... G02B 5/208; G02B 1/115; G02B 1/14; G02B 5/26; G02B 5/28; G02B 5/282;
(Continued)

(56) References Cited

U.S. PATENT DOCUMENTS

2018/0257977 A1 9/2018 Nagashima et al.
2018/0306954 A1 10/2018 Koyama et al.
(Continued)

FOREIGN PATENT DOCUMENTS

CN 110462463 A * 11/2019 ............. G02B 5/282
CN 112269220 A * 1/2021 ......... C23C 14/0629
(Continued)

OTHER PUBLICATIONS

International Search Report issued Jun. 13, 2023 in PCT/JP2023/014268 filed Apr. 6, 2023, 2 pages.
(Continued)

*Primary Examiner* — William R Alexander
*Assistant Examiner* — Alaina Marie Swanson
(74) *Attorney, Agent, or Firm* — Oblon, McClelland, Maier & Neustadt, L.L.P.

(57) ABSTRACT

To provide improved scratch resistance while transmitting light in a plurality of wavelength ranges. A transmission member (20) includes a base material (30) that transmits far-infrared rays, and a first functional film (32) that is formed on the base material (30). Average transmittance of the transmission member (20) with respect to light at a wavelength from 8 μm to 12 μm is equal to or larger than 50%, and transmittance of the transmission member (20) with respect to light from a laser beam source that emits light in a wavelength range from 0.8 μm to 1.8 μm is equal to or larger than 80%. A refractive index of an outermost layer (34) of the first functional film (32) with respect to light from the laser beam source is equal to or larger than 1.7.

15 Claims, 10 Drawing Sheets

(58) Field of Classification Search
CPC ... B60J 3/007; B60J 1/00; G01S 7/481; G01S 17/931
USPC ........................................................ 359/359
See application file for complete search history.

(56) References Cited

U.S. PATENT DOCUMENTS

| | | | |
|---|---|---|---|
| 2021/0025984 | A1 | 1/2021 | Schultz et al. |
| 2022/0132047 | A1 | 4/2022 | Nagashima et al. |
| 2023/0194759 | A1 | 6/2023 | Yasui et al. |

FOREIGN PATENT DOCUMENTS

| | | | | | |
|---|---|---|---|---|---|
| JP | 4-73601 | A | | 3/1992 | |
| JP | 2009-86533 | A | | 4/2009 | |
| JP | 2009086533 | A | * | 4/2009 | |
| JP | 2021-18253 | A | | 2/2021 | |
| WO | WO 2017/086227 | A1 | | 5/2017 | |
| WO | WO 2017/130934 | A1 | | 8/2017 | |
| WO | WO-2021014857 | A1 | * | 1/2021 | ............ H04N 23/56 |
| WO | WO 2022/045011 | A1 | | 3/2022 | |

OTHER PUBLICATIONS

Masanori Hiratsuka, et al., "Correlation between Optical Properties and Hardness of Diamond-Like Carbon Films*", Journal of Solid Mechanics and Materials Engineering, vol. 7, No. 2., 2013, 12 pages.

* cited by examiner

TRANSMISSION MEMBER

FIELD

The present invention relates to a transmission member.

BACKGROUND

For example, with diversification of sensors mounted on a vehicle and the like, there is a demand for a member that appropriately transmits light in a plurality of wavelength ranges. For example, Patent Literature 1 discloses a multilayer antireflection film having an antireflection effect on both of visible light in a wavelength range from 0.4 μm to 0.7 μm and far-infrared rays in a wavelength range from 8 μm to 12 μm. Patent Literature 1 discloses a configuration in which a high refractive index film and a low refractive index film are layered in this order from a substrate side.

CITATION LIST

Patent Literature

Patent Literature 1: Japanese Patent Application Laid-open No. H4-73601
Patent Literature 2: Japanese Patent Application Laid-open No. 2009-86533

Non Patent Literature

Non Patent Literature 1: Correlation between Optical Properties and Hardness of Diamond-Like Carbon Films, M. Hiratsuka et al., JSME, 7, 2 (2013)

SUMMARY

Technical Problem

There is a demand for improvement of scratch resistance of a member that transmits light in a plurality of wavelength ranges. However, in the multilayer antireflection film in Patent Literature 1, an outermost layer is a low refractive index film. All scratch-resistant films made of $ZrO_2$, $Si_3N_4$, diamond-like carbon (DLC), and the like, which are known as high hardness films, have high refractive index equal to or larger than 1.8. However, it is known that film hardness of the DLC has a positive correlation to a refractive index of the film (for example, refer to FIG. 7 in Non Patent Literature 1), and the transmission member in Patent Literature 1 including the low refractive index film as the outermost layer tends to be easily damaged.

On the other hand, in a transmission member of Patent Literature 2, the outermost layer is constituted of a high refractive index film and excellent in scratch resistance, but cannot transmit light in a plurality of wavelength ranges.

The present invention aims at providing a transmission member that can provide improved scratch resistance while transmitting light in a plurality of wavelength ranges.

Solution to Problem

The transmission member of the present disclosure comprises: a base material that transmits far-infrared rays; and a functional film that is formed on the base material, wherein average transmittance with respect to light at a wavelength from 8 μm to 12 μm is equal to or larger than 50%, transmittance with respect to light from a laser beam source that emits light in a wavelength range from 0.8 μm to 1.8 μm is equal to or larger than 80%, and a refractive index of an outermost layer of the functional film with respect to light from the laser beam source is equal to or larger than 1.7.

Advantageous Effects of Invention

According to the present invention, it is possible to provide improved scratch resistance while transmitting light in a plurality of wavelength ranges.

DESCRIPTION OF EMBODIMENTS

The following describes a preferred embodiment of the present invention in detail with reference to the attached drawings. The present invention is not limited to the embodiment, and in a case in which there are a plurality of embodiments, the embodiments may be combined with each other. Numerical values encompass rounded numerical values.

(Vehicle)

Figure 1:
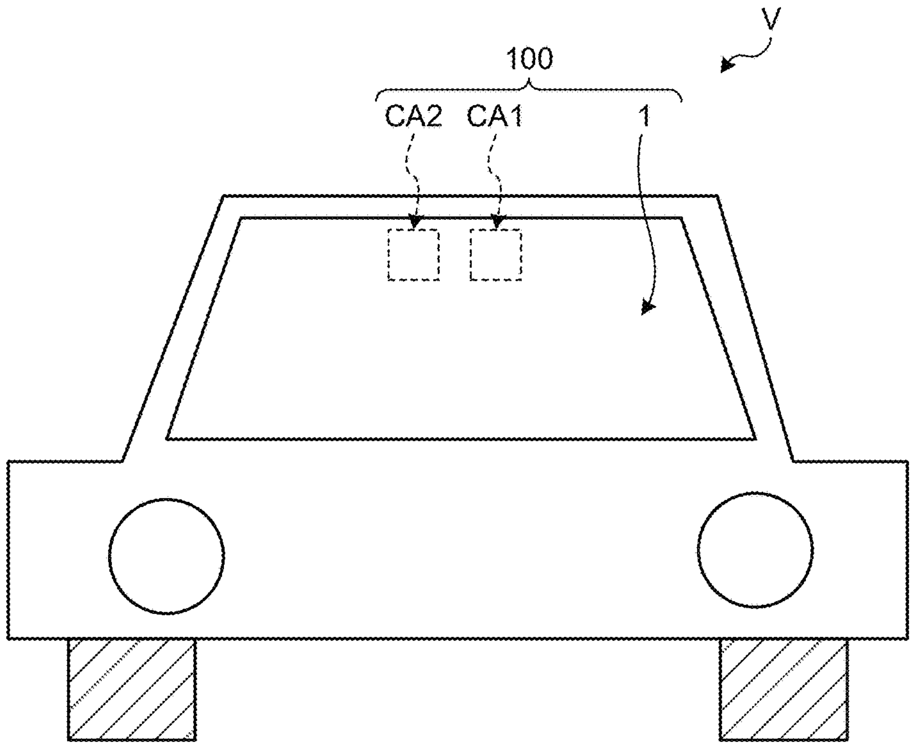
FIG. 1 is a schematic diagram illustrating a state in which glass for vehicles according to the present embodiment is mounted on a vehicle.

FIG. 1 is a schematic diagram illustrating a state in which glass for vehicles according to the present embodiment is mounted on a vehicle. As illustrated in FIG. 1, glass 1 for vehicles according to the present embodiment is mounted on a vehicle V. The glass 1 for vehicles is a window member applied to a windshield of the vehicle V. That is, the glass 1 for vehicles is used as a front window of the vehicle V, in other words, as windshield glass. A far-infrared camera CA1 and a visible light camera CA2 are mounted in an inner part of the vehicle V (inside of the vehicle). The inner part of the vehicle V (inside of the vehicle) refers to an inside of a vehicle cabin in which a driver's seat for a driver is disposed, for example.

The glass 1 for vehicles, the far-infrared camera CA1, and the visible light camera CA2 constitute a camera unit 100 according to the present embodiment. The far-infrared camera CA1 is a camera that detects far-infrared rays, and takes a thermal image of the outside of the vehicle V by detecting far-infrared rays from the outside of the vehicle V. The visible light camera CA2 is a camera that detects visible light, and takes an image of the outside of the vehicle V by detecting visible light from the outside of the vehicle V. The camera unit 100 may further include, for example, LiDAR or millimetric wave radar in addition to the far-infrared camera CA1 and the visible light camera CA2. Herein, the far-infrared rays are, for example, electromagnetic waves in a wavelength range from 8 μm to 13 μm, and the visible light is, for example, electromagnetic waves in a wavelength range from 360 nm to 830 nm. Herein, "8 μm to 13 μm" and "360 nm to 830 nm" mean "equal to or larger than 8 μm and equal to or smaller than 13 μm" and "equal to or larger than 360 nm and equal to or smaller than 830 nm", and the same applies to the following. The far-infrared rays may be electromagnetic waves in a wavelength range from 8 μm to 12 μm.

(Glass for Vehicles)

Figure 2:
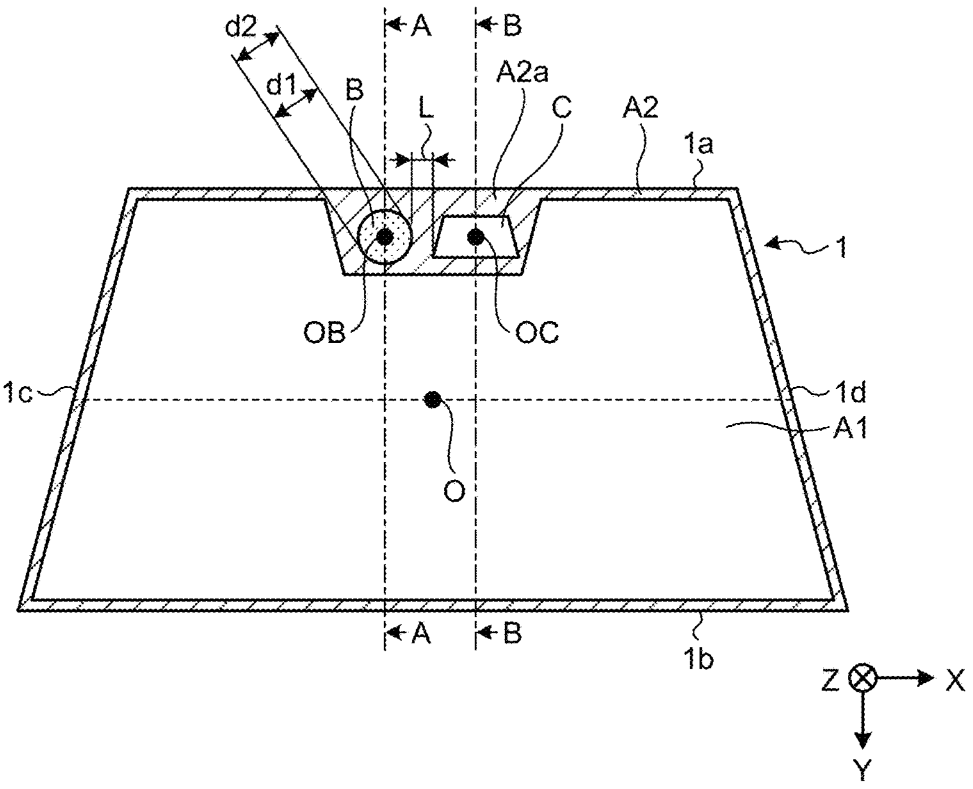
FIG. 2 is a schematic plan view of the glass for vehicles according to the present embodiment.
Figure 3:
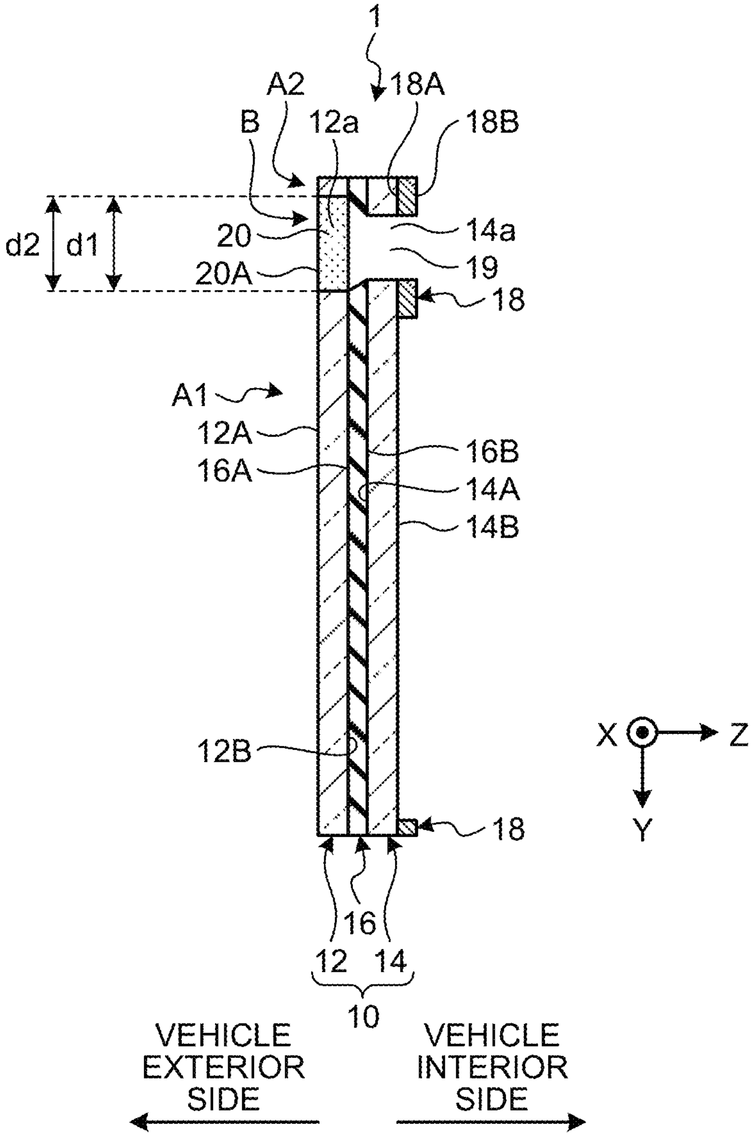
FIG. 3 is a cross-sectional view along a line A-A in FIG. 2.
Figure 4:
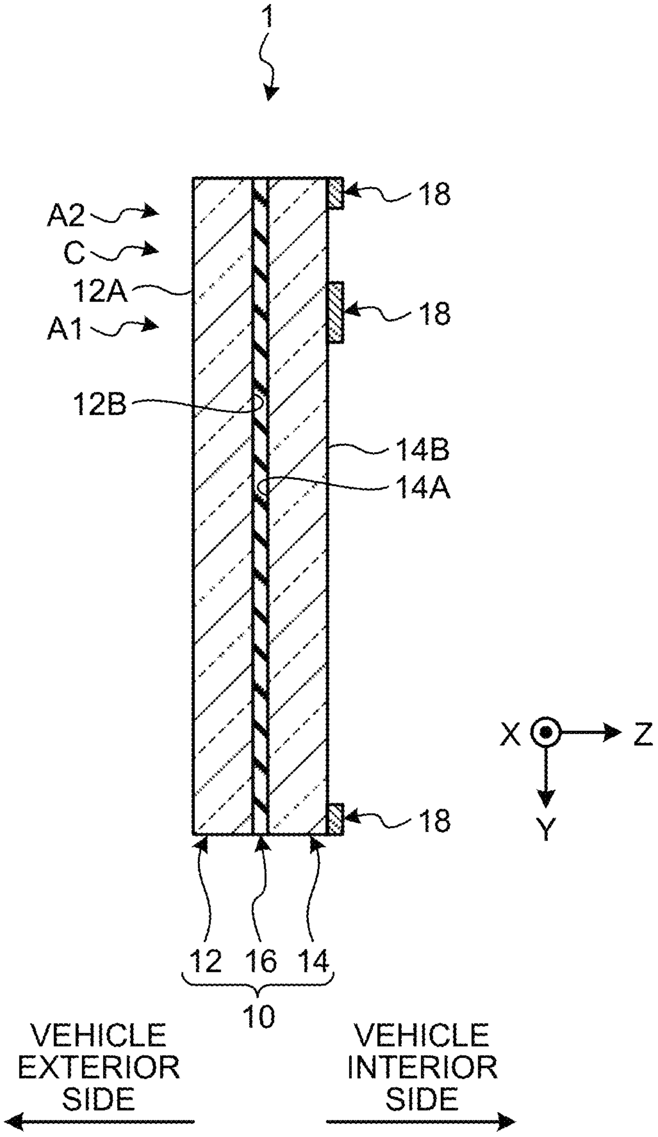
FIG. 4 is a cross-sectional view along a B-B cross section in FIG. 2.

FIG. 2 is a schematic plan view of the glass for vehicles according to the present embodiment. FIG. 3 is a cross-sectional view along a line A-A in FIG. 2. FIG. 4 is a cross-sectional view along a B-B cross section in FIG. 2. As illustrated in FIG. 2, hereinafter, an upper edge of the glass 1 for vehicles is referred to as an upper edge part 1*a*, a lower edge thereof is referred to as a lower edge part 1*b*, one side edge thereof is referred to as a side edge part 1*c*, and the other side edge thereof is referred to as a side edge part Id. The upper edge part 1*a* is an edge portion that is positioned on an upper side in a vertical direction when the glass 1 for vehicles is mounted on the vehicle V. The lower edge part 1*b* is an edge portion that is positioned on a lower side in the vertical direction when the glass 1 for vehicles is mounted on the vehicle V. The side edge part 1*c* is an edge portion that is positioned on one lateral side when the glass 1 for vehicles is mounted on the vehicle V. The side edge part 1*d* is an edge portion that is positioned on the other lateral side when the glass 1 for vehicles is mounted on the vehicle V.

Hereinafter, among directions parallel with a surface of the glass 1 for vehicles, a direction from the upper edge part 1*a* toward the lower edge part 1*b* is assumed to be a Y-direction, and a direction from the side edge part 1*c* toward the side edge part id is assumed to be an X-direction. In the present embodiment, the X-direction and the Y-direction are orthogonal to each other. A direction orthogonal to the surface of the glass 1 for vehicles, that is, a thickness direction of the glass 1 for vehicles, is assumed to be a Z-direction. The Z-direction is a direction from a vehicle exterior side of the vehicle V toward a vehicle interior side at the time when the glass 1 for vehicles is mounted on the vehicle V, for example. The X-direction and the Y-direction run along the surface of the glass 1 for vehicles. However, in a case in which the surface of the glass 1 for vehicles is a curved surface, for example, they may be directions tangential to the surface of the glass 1 for vehicles at a center point O of the glass 1 for vehicles. The center point O is a center position of the glass 1 for vehicles in a case of viewing the glass 1 for vehicles from the Z-direction.

A translucent region A1 and a light blocking region A2 are formed on the glass 1 for vehicles. The translucent region A1 is a region occupying a center portion of the glass 1 for vehicles when viewed from the Z-direction. The translucent region A1 is a region for securing a visual field of the driver. The translucent region A1 is a region that transmits visible light. The light blocking region A2 is a region formed around the translucent region A1 when viewed from the Z-direction. The light blocking region A2 is a region that blocks visible light. In the light blocking region A2, a far-infrared transmission region B and a visible light transmission region C are formed in a light blocking region A2a as a portion on the upper edge part 1*a* side.

The far-infrared transmission region B is a region that transmits far-infrared rays, and is a region in which the far-infrared camera CA1 is disposed. That is, the far-infrared camera CA1 is disposed at a position overlapping the far-infrared transmission region B when viewed from an optical axis direction of the far-infrared camera CA1. The visible light transmission region C is a region that transmits visible light, and is a region in which the visible light camera CA2 is disposed. That is, the visible light camera CA2 is disposed at a position overlapping the visible light transmission region C when viewed from an optical axis direction of the visible light camera CA2.

As described above, the far-infrared transmission region B and the visible light transmission region C are formed in the light blocking region A2, so that the light blocking region A2 blocks far-infrared rays in a region other than the region in which the far-infrared transmission region B is formed, and blocks visible light in a region other than the region in which the visible light transmission region C is formed. The light blocking region A2a is formed around the far-infrared transmission region B and the visible light transmission region C. It is preferable that various sensors are protected from sunlight due to the light blocking region A2a disposed around them. It is also preferable, from a viewpoint of designability, that wiring of various sensors is invisible from the outside of the vehicle.

As illustrated in FIG. 3, the glass 1 for vehicles includes a glass base body 12 (first glass base body), a glass base body 14 (second glass base body), an interlayer 16, and a light blocking layer 18. In the glass 1 for vehicles, the glass base body 12, the interlayer 16, the glass base body 14, and the light blocking layer 18 are laminated in this order in the Z-direction. The glass base body 12 and the glass base body 14 are fixed (bonded) to each other via the interlayer 16.

As the glass base bodies 12 and 14, for example, soda-lime glass, borosilicate glass, aluminosilicate glass, and the like can be used. The interlayer 16 is a bonding layer that bonds the glass base body 12 to the glass base body 14. As the interlayer 16, for example, polyvinyl butyral (hereinafter, also referred to as PVB) modified material, ethylene-vinyl acetate copolymer (EVA) material, urethane resin material, vinyl chloride resin material, and the like can be used. More specifically, the glass base body 12 includes one surface 12A and another surface 12B, and the other surface 12B is in contact with one surface 16A of the interlayer 16 and fixed (bonded) to the interlayer 16. The glass base body 14 includes one surface 14A and another surface 14B, and the one surface 14A is in contact with another surface 16B of the interlayer 16 and fixed (bonded) to the interlayer 16. As described above, the glass 1 for vehicles is laminated glass obtained by laminating the glass base body 12 and the glass base body 14. However, the glass 1 for vehicles is not limited to the laminated glass, and may have a configuration including only one of the glass base body 12 and the glass base body 14, for example. In this case, the interlayer 16 is not necessarily disposed. Hereinafter, in a case in which the glass base bodies 12 and 14 are not required to be distinguished from each other, they are referred to as a glass base body 10.

The light blocking layer 18 includes one surface 18A and another surface 18B, and the one surface 18A is in contact with and fixed to the other surface 14B of the glass base body 14. The light blocking layer 18 is a layer that blocks visible light. As the light blocking layer 18, for example, a ceramic light blocking layer or a light blocking film can be used. As the ceramic light blocking layer, for example, a ceramic layer made of conventionally known material such as a black ceramic layer can be used. As the light blocking film, for example, a light blocking polyethylene terephthalate (PET) film, light blocking polyethylene naphthalate (PEN) film, a light blocking polymethyl methacrylate (PMMA) film, and the like can be used.

In the present embodiment, a side of the glass 1 for vehicles on which the light blocking layer 18 is disposed is an interior side of the vehicle V (vehicle interior side), and a side on which the glass base body 12 is disposed is an exterior side of the vehicle V (vehicle exterior side), but the embodiment is not limited thereto. The light blocking layer 18 may be disposed on the exterior side of the vehicle V. In a case in which the glass 1 for vehicles is constituted of laminated glass of the glass base bodies 12 and 14, the light blocking layer 18 may be formed between the glass base body 12 and the glass base body 14.

(Light Blocking Region)

The light blocking region A2 is formed by disposing the light blocking layer 18 on the glass base body 10. That is, the light blocking region A2 is a region in which the glass base body 10 includes the light blocking layer 18. That is, the light blocking region A2 is a region in which the glass base body 12, the interlayer 16, the glass base body 14, and the light blocking layer 18 are laminated. On the other hand, the translucent region A1 is a region in which the glass base body 10 does not include the light blocking layer 18. That is, the translucent region A1 is a region in which the glass base body 12, the interlayer 16, and the glass base body 14 are laminated, and the light blocking layer 18 is not laminated.

(Far-Infrared Transmission Region) As illustrated in FIG. 3, on the glass 1 for vehicles, an opening part 19 is formed to pass through one surface (herein, the surface 12A) and the other surface (herein, the surface 14B) in the Z-direction. A transmission member 20 is disposed in the opening part 19. A region in which the opening part 19 is formed and the transmission member 20 is disposed is the far-infrared transmission region B. That is, the far-infrared transmission region B is a region in which the opening part 19 and the transmission member 20 that is disposed in the opening part 19 are disposed. The light blocking layer 18 does not transmit far-infrared rays, so that the light blocking layer 18 is not disposed in the far-infrared transmission region B. That is, in the far-infrared transmission region B, the glass base body 12, the interlayer 16, the glass base body 14, and the light blocking layer 18 are not disposed, and the transmission member 20 is disposed in the opening part 19 that has been formed. The transmission member 20 will be described later.

(Visible Light Region)

As illustrated in FIG. 4, the visible light transmission region C is a region in which the glass base body 10 does not include the light blocking layer 18 in the Z-direction similarly to the translucent region A1. That is, the visible light transmission region C is a region in which the glass base body 12, the interlayer 16, and the glass base body 14 are laminated, and the light blocking layer 18 is not laminated.

As illustrated in FIG. 2, the visible light transmission region C is preferably disposed in the vicinity of the far-infrared transmission region B. Specifically, the center of the far-infrared transmission region B viewed from the Z-direction is assumed to be a center point OB, and the center of the visible light transmission region C viewed from the Z-direction is assumed to be a center point OC. Assuming that the shortest distance between the far-infrared transmission region B (opening part 19) and the visible light transmission region C when viewed from the Z-direction is a distance L, the distance L is preferably longer than 0 mm and equal to or shorter than 100 mm, and more preferably equal to or longer than 10 mm and equal to or shorter than 80 mm. By setting the visible light transmission region C at a position within this range with respect to the far-infrared transmission region B, it is possible to suppress an amount of perspective distortion in the visible light transmission region C and enable the visible light camera CA2 to appropriately take an image while enabling the far-infrared camera CA1 and the visible light camera CA2 to take images at positions close to each other. By taking images at positions close to each other by the far-infrared camera CA1 and the visible light camera CA2, a load can be reduced at the time of performing arithmetic processing on data obtained from the respective cameras, and power supplies and signal cables can be preferably handled.

As illustrated in FIG. 2, the visible light transmission region C and the far-infrared transmission region B are preferably positioned side by side in the X-direction. That is, the visible light transmission region C is not positioned on the Y-direction side of the far-infrared transmission region B, and is preferably arranged side by side with the far-infrared transmission region B in the X-direction. By arranging the visible light transmission region C side by side with the far-infrared transmission region B in the X-direction, the visible light transmission region C can be disposed in the vicinity of the upper edge part 1*a*. Thus, the visual field of the driver in the translucent region A1 can be appropriately secured.

(Transmission Member)

Figure 5:
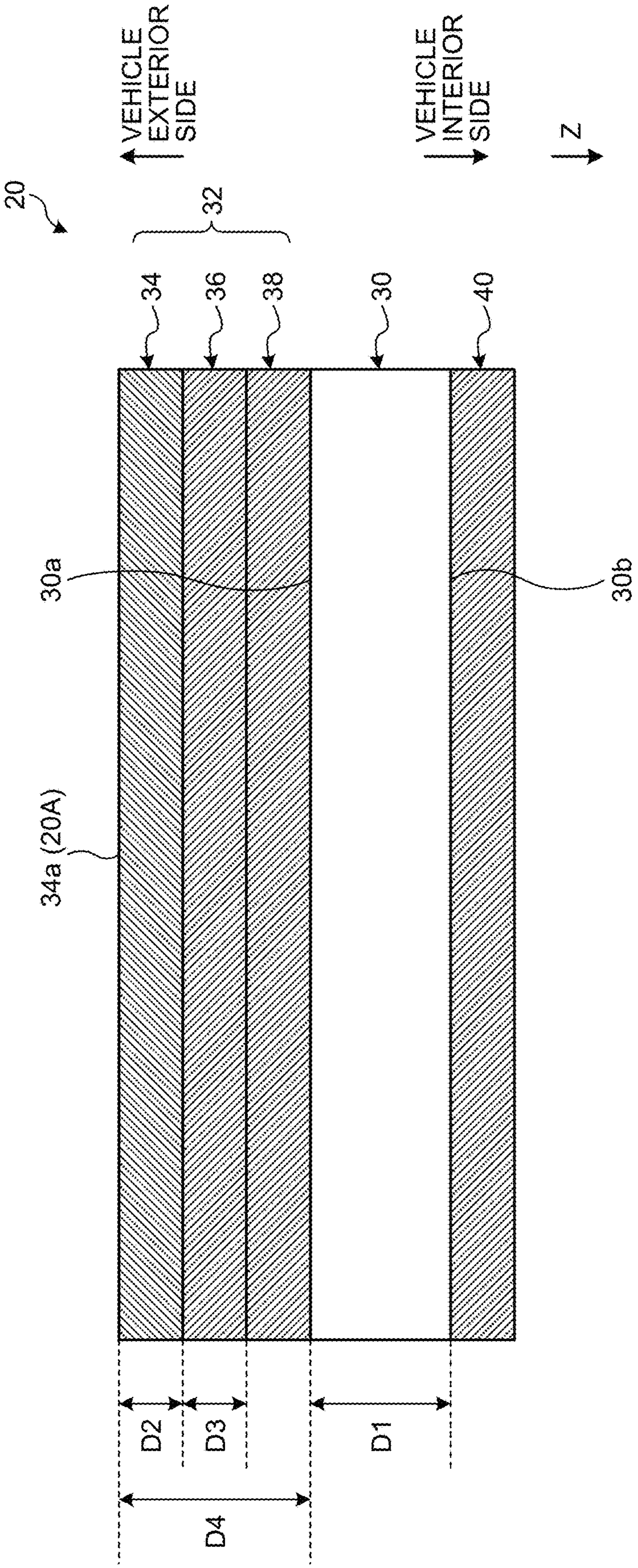
FIG. 5 is a schematic cross-sectional view of a transmission member according to the present embodiment.

The following specifically describes the transmission member 20 disposed in the far-infrared transmission region B. FIG. 5 is a schematic cross-sectional view of the transmission member according to the present embodiment. As illustrated in FIG. 5, the transmission member 20 includes a base material 30, a first functional film 32 as a functional film that is formed on the base material 30, and a second functional film 40 that is formed on the base material 30. In the present embodiment, the first functional film 32 is formed on one surface 30*a* side of the base material 30. The surface 30*a* is a surface on the vehicle exterior side in a case of being mounted on the glass 1 for vehicles. The second functional film 40 is formed on another surface 30*b* side of the base material 30. The surface 30*b* is a surface on the vehicle interior side in a case of being mounted on the glass 1 for vehicles. However, the second functional film 40 is not an essential component, and a layer other than the base material 30 is not necessarily disposed on the surface 30*b*.

In the present embodiment, the transmission member 20 is disposed in the light blocking region A2 of the glass 1 for vehicles as a window member of the vehicle V, but the embodiment is not limited thereto. The transmission member 20 may be disposed on any exterior member of the vehicle V such as an exterior member for pillars of the vehicle V. Alternatively, a sensor that detects light in a wavelength range from 0.8 μm to 1.8 μm may be disposed on the vehicle interior side with respect to the glass 1 for vehicles of the vehicle V, an opening may be formed at a position opposed to this sensor on the glass 1 for vehicles, and the transmission member 20 may be disposed in the opening. The light in the wavelength range from 0.8 μM to 1.8 μm is appropriately referred to as near-infrared light hereinafter. Examples of a sensor that detects near-infrared light in the wavelength range from 0.8 μm to 1.8 μm include LiDAR and the like using near-infrared light, for example. Alternatively, an opening may be formed at a position opposed to the visible light camera CA2 on the glass 1 for vehicles, and the transmission member 20 may be disposed in the opening.

That is, it can be said that the transmission member 20 may be disposed in at least one of the opening disposed at the position opposed to the sensor (far-infrared camera CA1) that detects light in the wavelength range from 8 μm to 12 μm, the opening disposed at the position opposed to the sensor that detects light at a wavelength from 0.8 μm to 1.8 μm, and the opening disposed at the position opposed to the sensor (visible light camera CA2) that detects light at a wavelength from 360 nm to 830 nm of the glass 1 for vehicles. The transmission member 20 is not necessarily disposed on the vehicle V, but may be used for any use.

In the following description, light from a laser beam source that emits light in the wavelength range from 0.8 μm to 1.8 μm is appropriately referred to as single wavelength light. It can be said that the single wavelength light is light at a predetermined wavelength (single wavelength) in the wavelength range from 0.8 μm to 1.8 μm. Examples of a wavelength of the single wavelength light include 0.905 μm (905 nm), 1.35 μm (1350 nm), and 1.55 μm (1550 nm).

(Base Material)

The base material 30 is preferably a member that can transmit far-infrared rays. Internal transmittance of the base material 30 with respect to light (far-infrared rays) at a wavelength of 10 μm is preferably equal to or larger than 50%, more preferably equal to or larger than 60%, and even more preferably equal to or larger than 70%. Additionally, average internal transmittance of the base material 30 with respect to light at a wavelength from 8 μm to 12 μm is preferably equal to or larger than 50%, more preferably equal to or larger than 60%, and even more preferably equal to or larger than 70%. When the internal transmittance of the base material 30 with respect to a wavelength of 10 μm and the average internal transmittance thereof with respect to a wavelength from 8 μm to 12 μm fall within this numerical range, far-infrared rays can be appropriately transmitted, and performance of the far-infrared camera CA1 can be sufficiently exhibited, for example. Herein, the average internal transmittance means an average value of the internal transmittance with respect to light at each wavelength in the wavelength band (herein, from 8 μm to 12 μm). By adjusting a material of the base material 30 and a thickness of the base material 30, the internal transmittance can be appropriately adjusted.

The base material 30 is preferably a member that can transmit near-infrared rays. The internal transmittance of the base material 30 with respect to single wavelength light is preferably equal to or larger than 80%, more preferably equal to or larger than 90%, and even more preferably equal to or larger than 95%. By adjusting the material of the base material 30 and the thickness of the base material 30, the internal transmittance can be appropriately adjusted.

The internal transmittance of the base material 30 is transmittance excluding surface reflection losses on an incident side and an emitting side, which is known in the art, and can be measured by using a normal method. The measurement is performed as follows, for example.

A pair of flat-shaped samples (a first sample and a second sample) made of base materials having the same composition and having different thicknesses are prepared. It is assumed that both surfaces of the flat-shaped sample are parallel with each other and are optically polished planes. Assuming that external transmittance including a surface reflection loss of the first sample is T1, external transmittance including a surface reflection loss of the second sample is T2, the thickness of the first sample is Td1 (mm), and the thickness of the second sample is Td2 (mm), where Td1<Td2, internal transmittance τ with a thickness of Tdx (mm) can be calculated by the following expression (1).

$$\tau = \exp\left[-Tdx \times (lnT1 - lnT2)/\Delta Td\right] \quad (1)$$

External transmittance of infrared rays can be measured by a Fourier transform type infrared spectroscopic device (manufactured by Thermo Fisher Scientific Inc., trade name: Nicolet iS10), for example.

A refractive index of the base material 30 with respect to light at a wavelength of 10 μm is preferably equal to or larger than 1.5 and equal to or smaller than 4.0, more preferably equal to or larger than 2.0 and equal to or smaller than 4.0, and even more preferably equal to or larger than 2.2 and equal to or smaller than 3.5. An average refractive index of the base material 30 with respect to light at a wavelength from 8 μm to 12 μm is preferably equal to or larger than 1.5 and equal to or smaller than 4.0, more preferably equal to or larger than 2.0 and equal to or smaller than 4.0, and even more preferably equal to or larger than 2.2 and equal to or smaller than 3.5. When the refractive index and the average refractive index of the base material 30 fall within this numerical range, far-infrared rays can be appropriately transmitted, and performance of the far-infrared camera CA1 can be sufficiently exhibited, for example. Herein, the average refractive index means an average value of the refractive index with respect to light at each wavelength in the wavelength band (herein, from 8 μm to 12 μm). The refractive index can be determined by performing fitting of an optical model using, for example, polarization information obtained by an infrared spectroscopic ellipsometer (manufactured by J. A. Woollam Japan, IR-VASE-UT) and a spectral transmission spectrum obtained by a Fourier transform type infrared spectroscopic device.

The refractive index of the base material 30 with respect to single wavelength light is preferably equal to or larger than 1.8 and equal to or smaller than 4.2, more preferably equal to or larger than 2.0 and equal to or smaller than 3.6, and even more preferably equal to or larger than 2.1 and equal to or smaller than 3.6. When the refractive index of the base material 30 falls within this numerical range, single wavelength light can be appropriately transmitted, and performance of a sensor that detects near-infrared rays can be sufficiently exhibited, for example.

A thickness D1 of the base material 30 is preferably equal to or larger than 0.5 mm and equal to or smaller than 5 mm, more preferably equal to or larger than 1 mm and equal to or smaller than 4 mm, and even more preferably equal to or larger than 1.5 mm and equal to or smaller than 3 mm. When the thickness D1 falls within this range, far-infrared rays and single wavelength light can be appropriately transmitted while strength is secured. It can be said that the thickness D1 is a length in the Z-direction from the surface 30_a_ to the surface 30_b_ of the base material 30.

Material of the base material 30 is not particularly limited, and examples thereof include Si, Ge, ZnS, chalcogenide glass, and the like, for example. It can be said that the base material 30 preferably includes at least one material selected from the group consisting of Si, Ge, ZnS, and chalcogenide glass. By using such a material for the base material 30, far-infrared rays and single wavelength light can be appropriately transmitted.

A preferable composition of chalcogenide glass is a composition containing, in atom percentage, Ge+Ga; 7% to 25%, Sb; 0% to 35%, Bi; 0% to 20%, Zn; 0% to 20%, Sn; 0% to 20%, Si; 0% to 20%, La; 0% to 20%, S+Se+Te; 55% to 80%, Ti; 0.005% to 0.3%, Li+Na+K+Cs; 0% to 20%, and F+Cl+Br+I; 0% to 20%. This glass preferably has a glass transition point (Tg) from 140° C. to 550° C.

As a material for the base material 30, it is more preferable to use Si or ZnS.

(First Functional Film)

The first functional film 32 is formed on the surface 30*a* on the vehicle exterior side of the base material 30. The first functional film 32 is an antireflection film for far-infrared rays and single wavelength light. The first functional film 32 includes an outermost layer 34, a contact layer 36, and an intermediate layer 38. The outermost layer 34 is a layer that is disposed at a point farthest from the base material 30 in the first functional film 32, that is, on the outermost side of the vehicle in the present embodiment. In other words, the outermost layer 34 is a layer on the outermost side of the transmission member 20 (the outermost side of the vehicle in the present embodiment), and is exposed to the outside.

The contact layer 36 is a layer disposed on the base material 30 side with respect to the outermost layer 34 (on the vehicle interior side with respect to the outermost layer 34 in the present embodiment) in the first functional film 32, and is a layer in contact with the outermost layer 34 on the base material 30 side with respect to the outermost layer 34. That is, the contact layer 36 is a layer disposed at the second farthest position from the base material 30 (the second position counting from the vehicle exterior side in the present embodiment) in the first functional film 32.

The intermediate layer 38 is a layer disposed on the base material 30 side with respect to the outermost layer 34 (on the vehicle interior side with respect to the outermost layer 34 in the present embodiment) in the first functional film 32. That is, the intermediate layer 38 is disposed between the base material 30 and the outermost layer 34. More specifically, in the present embodiment, it can be said that the intermediate layer 38 is disposed on the base material 30 side with respect to the contact layer 36, and disposed between the base material 30 and the contact layer 36 in the first functional film 32.

However, the first functional film 32 does not necessarily include at least one of the contact layer 36 and the intermediate layer 38. That is, among the outermost layer 34, the contact layer 36, and the intermediate layer 38, the first functional film 32 may include only the outermost layer 34, may include only the outermost layer 34 and the contact layer 36, or may include only the outermost layer 34 and the intermediate layer 38.

The average refractive index of the first functional film 32 with respect to light at a wavelength of 10 μm is preferably close to a square root of the refractive index of the base material 30 with respect to light at a wavelength of 10 μm, more preferably equal to or larger than 1.3 and equal to or smaller than 2.5, even more preferably equal to or larger than 1.4 and equal to or smaller than 2.2, particularly preferably equal to or larger than 1.45 and equal to or smaller than 2.00, and most preferably equal to or larger than 1.53 and equal to or smaller than 1.90. When the average refractive index of the first functional film 32 falls within this numerical range, far-infrared rays can be appropriately transmitted. The average refractive index of the first functional film 32 can be calculated by {sum total of optical film thicknesses(=physical film thickness×refractive index) of respective layers constituting the first functional film 32}/{total film thickness (physical film thickness) of the layers}.

(Outermost Layer)

The refractive index of the outermost layer 34 with respect to single wavelength light is equal to or larger than 1.7, preferably equal to or larger than 1.7 and equal to or smaller than 4.2, more preferably equal to or larger than 1.8 and equal to or smaller than 3.6, even more preferably equal to or larger than 1.9 and equal to or smaller than 2.5, even more preferably equal to or larger than 2.0 and equal to or smaller than 2.4, and particularly preferably equal to or larger than 2.0 and smaller than 2.4. When the refractive index of the outermost layer 34 falls within this numerical range, single wavelength light can be appropriately transmitted, denseness of the film of the outermost layer 34 can be improved, and scratch resistance can be appropriately improved. In the example of the present embodiment, a wavelength of single wavelength light is 905 nm, 1350 nm, or 1550 nm, so that it can be said that the refractive index of the outermost layer 34 with respect to light at at least one of a wavelength of 905 nm, 1350 nm, and 1550 nm preferably falls within the range described above. Other characteristics for single wavelength light hereinafter may indicate characteristics for light at at least one of a wavelength of 905 nm, 1350 nm, and 1550 nm.

The outermost layer 34 can preferably transmit far-infrared rays. An extinction coefficient of the outermost layer 34 with respect to light at a wavelength of 10 μm is preferably equal to or smaller than 0.10, more preferably equal to or smaller than 0.05, and even more preferably equal to or smaller than 0.04. The extinction coefficient can be determined by performing fitting of an optical model using, for example, polarization information obtained by an infrared spectroscopic ellipsometer (manufactured by J. A. Woollam Japan, IR-VASE-UT) and a spectral transmission spectrum obtained by a Fourier transform type infrared spectroscopic device.

The outermost layer 34 can preferably transmit single wavelength light. The extinction coefficient of the outermost layer 34 with respect to single wavelength light is preferably equal to or smaller than 0.10, more preferably equal to or smaller than 0.05, and even more preferably equal to or smaller than 0.04.

A thickness D2 of the outermost layer 34 is preferably equal to or larger than 20 nm, more preferably equal to or larger than 30 nm and equal to or smaller than 500 nm, even more preferably equal to or larger than 50 nm and equal to or smaller than 400 nm, and most preferably equal to or larger than 100 nm and equal to or smaller than 350 nm. It can be said that the thickness D2 is a length in the Z-direction from a surface on the Z-direction side of the outermost layer 34 to a surface on a side opposite to the Z-direction.

A ratio of the thickness D2 of the outermost layer 34 to the thickness D1 of the base material 30 is preferably equal to or larger than 0.0005% and equal to or smaller than 0.030%, more preferably equal to or larger than 0.001% and equal to or smaller than 0.020%, and even more preferably equal to or larger than 0.002% and equal to or smaller than 0.02%.

A ratio of the thickness D2 of the outermost layer 34 to a thickness D4 of the first functional film 32 is preferably equal to or larger than 1% and equal to or smaller than 30%, more preferably equal to or larger than 3% and equal to or smaller than 25%, and most preferably equal to or larger than 5% and equal to or smaller than 25%. It can be said that the thickness D4 of the first functional film 32 is a length in the Z-direction from a surface on the Z-direction side of the first functional film 32 to a surface on a side opposite to the Z-direction. When the thickness D2 falls within this range, far-infrared rays and single wavelength light can be appropriately transmitted, and the scratch resistance can be appropriately improved.

A surface of the outermost layer 34 on a side opposite to the base material 30 is assumed to be a surface 34*a*. The surface 34*a* is a surface exposed to the outside, and is a surface on the vehicle exterior side in the present embodiment. In this case, arithmetic average roughness Ra (surface roughness) of the surface 34*a* of the outermost layer 34 is preferably equal to or smaller than 7.0 nm, more preferably equal to or smaller than 5.0 nm, even more preferably equal to or smaller than 4.0 nm, and most preferably equal to or smaller than 3.0 nm. When the arithmetic average roughness Ra of the surface 34*a* falls within this range, a dynamic friction coefficient and variation in the surface roughness before and after scratching can be reduced, and the scratch resistance can be improved more appropriately. The arithmetic average roughness Ra means arithmetic average roughness Ra defined in JIS B 0601:2001.

The outermost layer 34 may be constituted of any material. For example, it is preferable to use $ZrO_2$ or $TiO_2$, NiO, $Si_3N_4$, or DLC as a principal component, and more preferable to use $ZrO_2$ as a principal component. Herein, the principal component may mean that a content rate thereof with respect to the entire outermost layer 34 is equal to or larger than 50 mass %. In the outermost layer 34, the content rate of the principal component with respect to the entire outermost layer 34 is equal to or larger than 50 mass % and equal to or smaller than 100 mass %, preferably equal to or larger than 70 mass % and equal to or smaller than 100 mass %, and more preferably equal to or larger than 90 mass % and equal to or smaller than 100 mass %. Additionally, in the outermost layer 34, the content rate of the principal component as a single item, excluding inevitable impurities, is preferably 100 mass %. When the content rate of the principal component of the outermost layer 34 falls within this range, far-infrared rays and single wavelength light can be appropriately transmitted, and the scratch resistance can be improved.

The outermost layer 34 may contain an accessory component, which is a component other than the principal component. The accessory component is preferably oxide that transmits far-infrared rays and single wavelength light, and examples thereof include at least one of NiO, $Y_2O_3$, $HfO_2$, $TiO_2$, ZnO, MgO, and $Al_2O_3$.

(Contact Layer)

A refractive index of the contact layer 36 with respect to single wavelength light is preferably lower than a refractive index of the outermost layer 34 with respect to single wavelength light. Additionally, the refractive index of the contact layer 36 with respect to single wavelength light is preferably equal to or smaller than a square root of the refractive index of the base material 30 with respect to single wavelength light. That is, it can be said that the outermost layer 34 functions as a high refractive index film, and the contact layer 36 functions as a low refractive index film.

A ratio of the refractive index of the contact layer 36 with respect to single wavelength light to the refractive index of the outermost layer 34 with respect to single wavelength light is preferably equal to or smaller than 1, more preferably equal to or larger than 0.5 and equal to or smaller than 1, and even more preferably equal to or larger than 0.6 and equal to or smaller than 0.8.

The refractive index of the contact layer 36 with respect to single wavelength light is preferably equal to or smaller than 1.7, more preferably equal to or larger than 1.0 and equal to or smaller than 1.5, and even more preferably equal to or larger than 1.1 and equal to or smaller than 1.4. When the refractive index of the contact layer 36 falls within this numerical range, single wavelength light can be appropriately transmitted.

The contact layer 36 can preferably transmit far-infrared rays. An extinction coefficient of the contact layer 36 with respect to light at a wavelength of 10 μm is preferably equal to or smaller than 0.10, more preferably equal to or smaller than 0.05, and even more preferably equal to or smaller than 0.04.

The contact layer 36 can preferably transmit single wavelength light. The extinction coefficient of the contact layer 36 with respect to single wavelength light is preferably equal to or smaller than 0.10, more preferably equal to or smaller than 0.05, and even more preferably equal to or smaller than 0.04.

A thickness D3 of the contact layer 36 is preferably equal to or larger than 50 nm and equal to or smaller than 500 nm, more preferably equal to or larger than 60 nm and equal to or smaller than 400 nm, and even more preferably equal to or larger than 70 nm and equal to or smaller than 300 nm. It can be said that the thickness D3 is a length in the Z-direction from a surface of the contact layer 36 in the Z-direction to a surface i the direction opposite to the Z-direction.

A ratio of the thickness D3 of the contact layer 36 to the thickness D2 of the outermost layer 34 is preferably equal to or larger than 0.5 and equal to or smaller than 10, more preferably equal to or larger than 1 and equal to or smaller than 6, and even more preferably equal to or larger than 1.2 and equal to or smaller than 3.

When the thickness D2 falls within this range, far-infrared rays and single wavelength light can be appropriately transmitted.

The contact layer 36 may be constituted of any material. For example, it is preferable to use $MgF_2$, $YF_3$, or $YbF_3$ as a principal component, and more preferable to use $MgF_2$ as a principal component. In the contact layer 36, a content rate of the principal component with respect to the entire contact layer 36 is equal to or larger than 50 mass % and equal to or smaller than 100 mass %, preferably equal to or larger than 70 mass % and equal to or smaller than 100 mass %, and more preferably equal to or larger than 90 mass % and equal to or smaller than 100 mass %. Additionally, in the contact layer 36, the content rate of the principal component as a single item, excluding inevitable impurities, is preferably 100 mass %. When the content rate of the principal component of the contact layer 36 falls within this range, far-infrared rays and single wavelength light can be appropriately transmitted.

(Outermost Layer and Contact Layer)

Conventionally, to provide a sufficient antireflection function against single wavelength light, a high refractive index layer and a low refractive index layer are required to be laminated in order on the outermost side, and the low refractive index layer becomes the outermost layer, so that the scratch resistance cannot be improved. On the other hand, as a result of vigorous investigation, the present inventors have devised a way to expand a range of the refractive index of the outermost layer 34, which is allowed to provide a sufficient antireflection function, by relatively increasing the refractive index of the base material 30 as the range described above. Specifically, the present inventors have found that a sufficient antireflection function against single wavelength light can be provided even when the low refractive index layer and the high refractive index layer are laminated in order on the outermost side, and the high refractive index layer becomes the outermost layer 34. That is, in the transmission member 20 according to the present embodiment, single wavelength light can be appropriately transmitted by laminating the low refractive index layer and the high refractive index layer in order on the outermost side and causing the high refractive index layer to be the outermost layer 34, and the scratch resistance can also be improved by causing the outermost layer 34 to be a dense high refractive index layer.

Thicknesses of respective films of two-layer antireflection film constituted of two transparent films each having any refractive index can be calculated by using expressions (2) and (3).

$$\tan^2\delta_1 = \frac{n_1^2(n_3-n_0)(n_2^2-n_0n_3)}{(n_1^2n_3-n_2^2n_0)(n_0n_3-n_1^2)} \tag{2}$$

$$\tan^2\delta_2 = \frac{n_2^2(n_3-n_0)(n_0n_3-n_1^2)}{(n_1^2n_3-n_2^2n_0)(n_2^2-n_0n_3)} \tag{3}$$

In the expressions (2) and (3), $n_0$ is a refractive index of a medium, $n_s$ is a refractive index of the base material, $n_1$ is a refractive index of a film on an outer side, $n_2$ is a refractive index of a film on an inner side, $\delta_1$ is a phase film thickness on the outer side, and $\delta_2$ is a phase film thickness on the inner side. The present inventors have found that, when the high refractive index film is arranged on the outer side, that is, $n_1>n_2$ is satisfied, an antireflection effect is exhibited by satisfying $n_3<n_1^2$ and $n_2^2<n_3$.

(Intermediate Layer)

Figure 6:
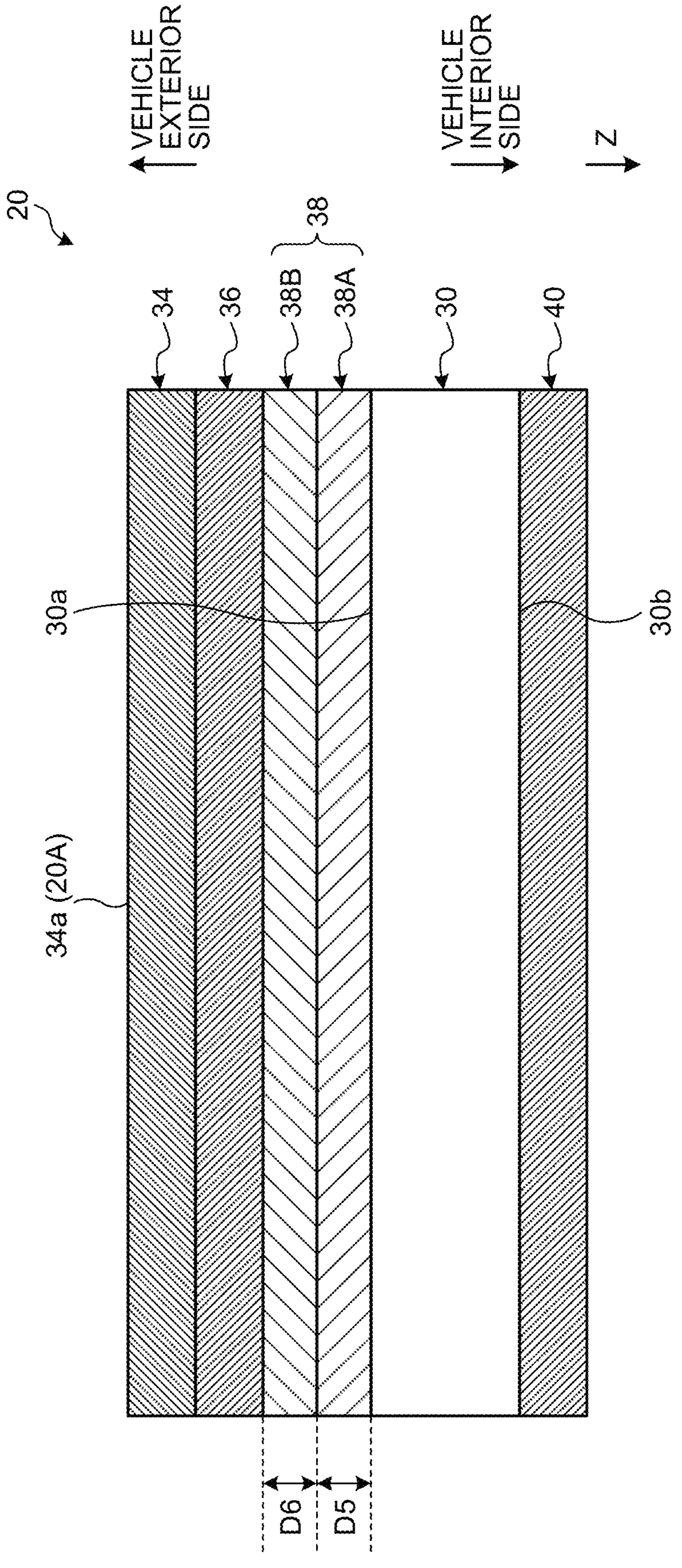
FIG. 6 is a schematic cross-sectional view illustrating an example of an intermediate layer.
Figure 7:
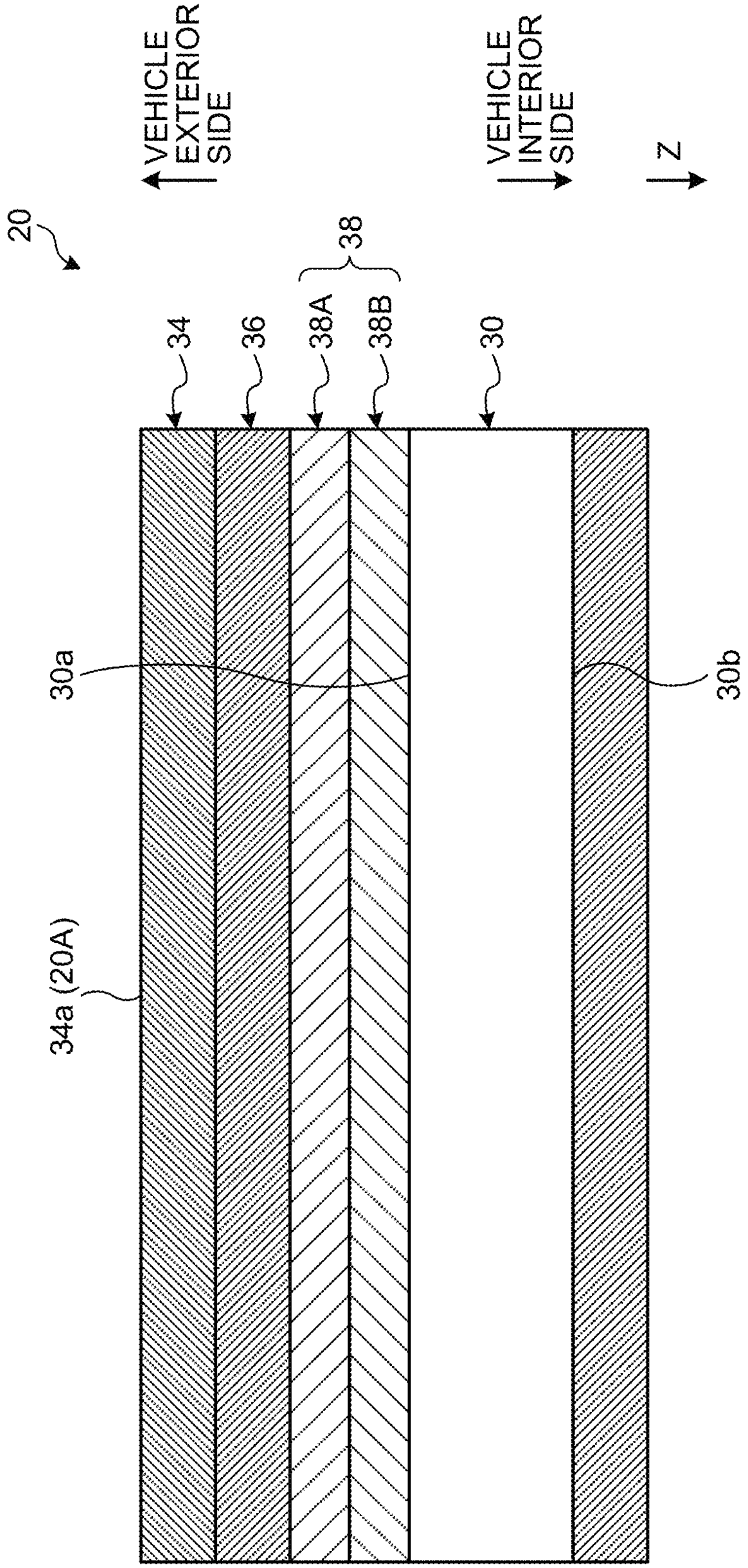
FIG. 7 is a schematic cross-sectional view illustrating an example of an intermediate layer.

FIG. 6 and FIG. 7 are schematic cross-sectional views illustrating an example of the intermediate layer. The intermediate layer 38 can transmit far-infrared rays and single wavelength light. As illustrated in FIG. 6, the intermediate layer 38 includes a high refractive index layer 38A and a low refractive index layer 38B. In the intermediate layer 38, the high refractive index layer 38A and the low refractive index layer 38B are alternately laminated. In the example of FIG. 6, the intermediate layer 38 is laminated on the base material 30 in order of the high refractive index layer 38A and the low refractive index layer 38B in a direction away from the base material 30. That is, in the intermediate layer 38, a layer formed to be closest to the base material 30 side is the high refractive index layer 38A, and a layer farthest from the base material 30 is the low refractive index layer 38B.

However, a laminating configuration of the intermediate layer 38 is not limited to the laminating configuration illustrated in FIG. 6. As illustrated in FIG. 7, the low refractive index layer 38B and the high refractive index layer 38A may be laminated in order in a direction away from the base material 30. That is, in the intermediate layer 38, a layer formed to be closest to the base material 30 side may be the low refractive index layer 38B, and a layer farthest from the base material 30 may be the high refractive index layer 38A.

In the examples of FIG. 6 and FIG. 7, the intermediate layer 38 has a configuration in which one high refractive index layer 38A and one low refractive index layer 38B are laminated. However, the numbers of the high refractive index layers 38A and the low refractive index layers 38B to be laminated are not limited to one each, and may be two or more. That is, assuming that a pair of the high refractive index layer 38A and the low refractive index layer 38B being in contact with each other are laminated bodies, the number of the laminated bodies may be any number. A total value of optical film thicknesses of the respective layers constituting the first functional film 32 is preferably λ/4 (λ=10 μm), and more preferably equal to or larger than 2 μm and equal to or smaller than 3 μm. By setting the number of laminations so that the total value of the optical film thicknesses of the respective layers of the first functional film 32 falls within this range, far-infrared rays can be appropriately transmitted.

The intermediate layer 38 does not necessarily have a configuration in which the high refractive index layer 38A and the low refractive index layer 38B are laminated. For example, the intermediate layer 38 may include at least one low refractive index layer 38B. That is, the intermediate layer 38 may be a single layer film constituted of one low refractive index layer 38B, but is preferably a multilayer film in which the high refractive index layer 38A and the low refractive index layer 38B are laminated.

(High Refractive Index Layer)

A refractive index of the high refractive index layer 38A with respect to single wavelength light is preferably equal to or larger than 1.5, more preferably equal to or larger than 1.5 and equal to or smaller than 4.2, even more preferably equal to or larger than 1.6 and equal to or smaller than 3.6, and most preferably equal to or larger than 1.7 and equal to or smaller than 2.5. When the refractive index of the high refractive index layer 38A falls within this numerical range, single wavelength light can be appropriately transmitted.

The high refractive index layer 38A can preferably transmit far-infrared rays. An extinction coefficient of the high refractive index layer 38A with respect to light at a wavelength of 10 μm is preferably equal to or smaller than 0.10, more preferably equal to or smaller than 0.05, and even more preferably equal to or smaller than 0.04.

The high refractive index layer 38A can preferably transmit single wavelength light. An extinction coefficient of the high refractive index layer 38A with respect to single wavelength light is preferably equal to or smaller than 0.10, more preferably equal to or smaller than 0.05, and even more preferably equal to or smaller than 0.04.

A thickness D5 of the high refractive index layer 38A is preferably equal to or larger than 50 nm and equal to or smaller than 400 nm, more preferably equal to or larger than 70 nm and equal to or smaller than 300 nm, and even more preferably equal to or larger than 70 nm and equal to or smaller than 250 nm. It can be said that the thickness D5 is a length in the Z-direction from a surface on the Z-direction side of the high refractive index layer 38A to a surface on a side opposite to the Z-direction.

As illustrated in FIG. 6, in a case of a configuration in which the high refractive index layer 38A and the low refractive index layer 38B are laminated in order, a ratio of the thickness D5 of the high refractive index layer 38A to a thickness D6 of the low refractive index layer 38B is preferably equal to or larger than 10% and equal to or smaller than 150%, more preferably equal to or larger than 10% and equal to or smaller than 100%, and even more preferably equal to or larger than 20% and equal to or smaller than 70%.

As illustrated in FIG. 7, in a case of a configuration in which the low refractive index layer 38B and the high refractive index layer 38A are laminated in order, the ratio of the thickness D5 of the high refractive index layer 38A to the thickness D6 of the low refractive index layer 38B is preferably equal to or larger than 5% and equal to or smaller than 100%, more preferably equal to or larger than 10% and equal to or smaller than 70%, and even more preferably equal to or larger than 15% and equal to or smaller than 50%.

When the thickness D5 falls within this range, far-infrared rays and single wavelength light can be appropriately transmitted.

The high refractive index layer 38A may be constituted of any material. For example, it is preferable to use Ge, Si, ZnS, $Y_2O_3$, $HfO_2$, $TiO_2$, ZnO, MgO, $Al_2O_3$, $Si_3N_4$, or DLC as a principal component, and more preferable to use MgO as a principal component. In the high refractive index layer 38A, a content rate of the principal component with respect to the entire high refractive index layer 38A is equal to or larger than 50 mass % and equal to or smaller than 100 mass %, preferably equal to or larger than 70 mass % and equal to or smaller than 100 mass %, and more preferably equal to or larger than 90 mass % and equal to or smaller than 100 mass %. Additionally, in the high refractive index layer 38A, the content rate of the principal component as a single item, excluding inevitable impurities, is preferably 100 mass %. When the content rate of the principal component of the high refractive index layer 38A falls within this range, far-infrared rays and single wavelength light can be appropriately transmitted.

The high refractive index layer 38A may contain an accessory component, which is a component other than the principal component. The accessory component is preferably oxide that transmits far-infrared rays and single wavelength light, and examples thereof include at least one of NiO, $Y_2O_3$, $HfO_2$, $TiO_2$, ZnO, MgO, and $Al_2O_3$.

(Low Refractive Index Layer)

A refractive index of the low refractive index layer 38B with respect to single wavelength light is lower than the refractive index of the high refractive index layer 38A with respect to single wavelength light. A ratio of the refractive index of the low refractive index layer 38B with respect to single wavelength light to the refractive index of the high refractive index layer 38A with respect to single wavelength light is preferably equal to or larger than 30% and equal to or smaller than 100%, more preferably equal to or larger than 50% and equal to or smaller than 90%, and even more preferably equal to or larger than 60% and equal to or smaller than 80%.

A refractive index of the low refractive index layer 38B with respect to single wavelength light is preferably equal to or larger than 1.3, more preferably equal to or larger than 1.3 and equal to or smaller than 1.6, even more preferably equal to or larger than 1.3 and equal to or smaller than 1.5, and most preferably equal to or larger than 1.3 and equal to or smaller than 1.45. When the refractive index of the low refractive index layer 38B falls within this numerical range, single wavelength light can be appropriately transmitted.

The low refractive index layer 38B can preferably transmit far-infrared rays. An extinction coefficient of the low refractive index layer 38B with respect to light at a wavelength of 10 μm is preferably equal to or smaller than 0.10, more preferably equal to or smaller than 0.05, and even more preferably equal to or smaller than 0.04.

The low refractive index layer 38B can preferably transmit single wavelength light. An extinction coefficient of the low refractive index layer 38B with respect to single wavelength light is preferably equal to or smaller than 0.10, more preferably equal to or smaller than 0.05, and even more preferably equal to or smaller than 0.04.

The thickness D6 of the low refractive index layer 38B is preferably equal to or larger than 50 nm and equal to or smaller than 500 nm, more preferably equal to or larger than 80 nm and equal to or smaller than 450 nm, and even more preferably equal to or larger than 100 nm and equal to or smaller than 400 nm. It can be said that the thickness D6 is a length in the Z-direction from a surface on the Z-direction side of the low refractive index layer 38B to a surface on a side opposite to the Z-direction.

When the thickness D6 falls within this range, far-infrared rays can be appropriately transmitted.

The low refractive index layer 38B may be constituted of any material. For example, it is preferable to use $MgF_2$, $YF_3$, or $YbF_3$ as a principal component, and more preferable to use $MgF_2$ as a principal component. In the low refractive index layer 38B, a content rate of the principal component with respect to the entire low refractive index layer 38B is equal to or larger than 50 mass % and equal to or smaller than 100 mass %, preferably equal to or larger than 70 mass % and equal to or smaller than 100 mass %, and more preferably equal to or larger than 90 mass % and equal to or smaller than 100 mass %. Additionally, in the low refractive index layer 38B, the content rate of the principal component as a single item, excluding inevitable impurities, is preferably 100 mass %. When the content rate of the principal component of the low refractive index layer 38B falls within this range, far-infrared rays and single wavelength light can be appropriately transmitted.

The low refractive index layer 38B may contain an accessory component, which is a component other than the principal component. The accessory component is preferably oxide that transmits far-infrared rays and single wavelength light, and examples thereof include MgO, for example.

(Second Functional Film)

The second functional film 40 disposed on the surface 30*b* on the vehicle interior side of the base material 30 is a layer that transmits far-infrared rays and single wavelength light. The second functional film 40 may have the same configuration as that of the intermediate layer 38.

(Adhesion Layer)

An adhesion layer (not illustrated) may be formed between the intermediate layer 38 and the base material 30. An adhesion film is a film that causes the base material 30 to adhere to the intermediate layer 38, in other words, a film that improves adhesion between the base material 30 and the intermediate layer 38.

A refractive index of the adhesion layer with respect to single wavelength light is preferably equal to or larger than 1.4, more preferably equal to or larger than 1.4 and equal to or smaller than 3.6, and even more preferably equal to or larger than 2.0 and equal to or smaller than 2.4.

A refractive index of the adhesion layer with respect to light at a wavelength of 10 μm is preferably equal to or larger than 1.4, more preferably equal to or larger than 1.4 and equal to or smaller than 3.6, and even more preferably equal to or larger than 1.6 and equal to or smaller than 2.2. When the refractive index of the adhesion layer falls within this numerical range, far-infrared rays and single wavelength light can be appropriately transmitted.

The adhesion layer can preferably transmit far-infrared rays. An extinction coefficient of the adhesion layer with respect to light at a wavelength of 10 μm is preferably equal to or smaller than 0.10, more preferably equal to or smaller than 0.05, and even more preferably equal to or smaller than 0.04.

The adhesion layer can preferably transmit single wavelength light. An extinction coefficient of the adhesion layer with respect to single wavelength light is preferably equal to or smaller than 0.10, more preferably equal to or smaller than 0.05, and even more preferably equal to or smaller than 0.04.

A thickness of the adhesion film is preferably equal to or larger than 0.05 μm and equal to or smaller than 0.5 μm, more preferably equal to or larger than 0.05 μm and equal to or smaller than 0.3 μm, and even more preferably equal to or larger than 0.05 μm and equal to or smaller than 0.1 μm. When the thickness of the adhesion film falls within this range, the base material 30 can be caused to appropriately adhere to the intermediate layer 38 while reflection of single wavelength light and far-infrared rays is appropriately suppressed. It can be said that the thickness of the adhesion film is a length in the Z-direction from a surface on the Z-direction side of the adhesion film to a surface on a side opposite to the Z-direction. The thickness of the adhesion film is preferably thinner than the thickness of the intermediate layer 38, the thickness of the contact layer 36, and the thickness of the outermost layer 34. When the thickness of the adhesion film is thinner than the thicknesses of these layers, influence on optical performance can be reduced.

Material of the adhesion film is any material. For example, the adhesion film preferably contains at least one material selected from the group consisting of Si, Ge, MgO, $NiO_x$, $CuO_x$, ZnS, $Al_2O_3$, $ZrO_2$, $SiO_2$, $TiO_2$, ZnO, and $Bi_2O_3$, for example, and more preferably contains $ZrO_2$. By using such a material for the adhesion film, the base material 30 can be caused to appropriately adhere to the intermediate layer 38.

(Characteristics of Transmission Member)

As described above, the transmission member 20 is obtained by forming the first functional film 32 including the outermost layer 34 on the surface 30*a* of the base material 30. When the outermost layer 34 is formed, the transmission member 20 can appropriately improve the scratch resistance while appropriately transmitting single wavelength light and far-infrared rays.

Transmittance of the transmission member 20 with respect to light at a wavelength of 10 μm is preferably equal to or larger than 50%, more preferably equal to or larger than 65%, and even more preferably equal to or larger than 70%. Average transmittance of the transmission member 20 with respect to light at a wavelength from 8 μm to 12 μm is equal to or larger than 50%, more preferably equal to or larger than 65%, and even more preferably equal to or larger than 70%. When the transmittance and the average transmittance fall within this range, far-infrared rays can be appropriately transmitted.

The transmittance of the transmission member 20 with respect to single wavelength light is equal to or larger than 80%, more preferably equal to or larger than 85%, even more preferably equal to or larger than 90%, and most preferably equal to or larger than 95%. When the transmittance falls within this range, single wavelength light can be appropriately transmitted.

Reflectance of the transmission member 20 with respect to light at a wavelength of 10 μm is preferably equal to or smaller than 20%, more preferably equal to or smaller than 10%, and even more preferably equal to or smaller than 5%. Average reflectance of the transmission member 20 with respect to light at a wavelength from 8 μm to 12 μm is preferably equal to or smaller than 20%, more preferably equal to or smaller than 10%, and even more preferably equal to or smaller than 5%. When the reflectance and the average reflectance fall within this range, far-infrared rays can be appropriately transmitted. The average reflectance means an average value of the reflectances with respect to light at respective wavelengths in the wavelength band (herein, from 8 μm to 12 μm). The reflectance can be measured by a Fourier transform type infrared spectroscopic device (manufactured by Thermo Fisher Scientific Inc., Nicolet iS10), for example.

The reflectance of the transmission member 20 with respect to single wavelength light is preferably equal to or smaller than 10%, more preferably equal to or smaller than 5%, even more preferably equal to or smaller than 2%, and most preferably equal to or smaller than 1%. When the reflectance falls within this range, single wavelength light can be appropriately transmitted.

In the transmission member 20, indentation hardness of a surface 20A on the vehicle exterior side (that is, the surface 34*a* of the outermost layer 34) in a range of indentation depth equal to or larger than 90 nm and equal to or smaller than 110 nm is preferably equal to or larger than 9.0 GPa, more preferably equal to or larger than 10.0 GPa, more preferably equal to or larger than 11.0 GPa, even more preferably equal to or larger than 12.0 GPa, and most preferably equal to or larger than 13.0 GPa. When the indentation hardness of the surface 20A falls within this range, the scratch resistance can be appropriately improved.

The indentation hardness of the surface 20A means indentation hardness in a range of indentation depth equal to or larger than 90 nm and equal to or smaller than 110 nm measured by a nanoindentation method (continuous stiffness measurement) using a nanoindenter. More specifically, the indentation hardness is a value that is obtained based on a displacement-load curve from loading to unloading of a measuring indenter, and defined in ISO 14577.

The indentation hardness can be measured as follows. Specifically, an indentation depth h (nm) corresponding to an indentation load P (mN) is continuously measured over the entire process from start of loading to unloading at a measurement point using an iMicro nanoindenter manufactured by KLA Corporation, and a P-h curve is generated. As represented by the following expression (4), indentation hardness H (GPa) is calculated based on the generated P-h curve.

$$H = P/A \tag{4}$$

In the expression (4), P represents an indentation load (mN), and A represents a projection area ($\mu m^2$) of the indenter.

In the present embodiment, the indentation hardness H in a section having an indentation depth equal to or larger than 90 nm and equal to or smaller than 110 nm is assumed to be the indentation hardness of the surface 20A. That is, in the present embodiment, it can be said that the indentation hardness H preferably satisfies the range described above over all sections having an indentation depth equal to or larger than 90 nm and equal to or smaller than 110 nm.

As illustrated in FIG. 3, the surface 20A on the vehicle exterior side of the transmission member 20 is preferably formed to be flush with (continuous to) the surface on the vehicle exterior side of the light blocking region A2. In other words, the surface 20A on the vehicle exterior side of the transmission member 20 is attached to be continuous to the surface 12A of the glass base body 12. In this way, the surface 20A of the transmission member 20 is continuous to the surface 12A of the glass base body 12, so that a wiping effect of wipers can be prevented from being impaired. Additionally, it is possible to prevent a risk such that designability of the vehicle V is impaired due to a step, or dust and the like are accumulated on the step. Furthermore, the transmission member 20 is preferably shaped to match a curved surface shape of the glass 1 for vehicles to be applied. A method for shaping the transmission member 20 is not particularly limited, and polishing or molding is selected correspondingly to the curved surface shape or a member.

The shape of the transmission member 20 is not particularly limited, and may be a plate shape matching the shape of the opening part 19. That is, for example, in a case in which the opening part 19 has a circular shape, the transmission member 20 preferably has a disc shape (cylindrical shape). From a viewpoint of designability, a surface shape of the transmission member 20 on the vehicle exterior side may be processed to match a curvature of an outer surface shape of the glass base body 12. Furthermore, the transmission member 20 may have a lens shape for a reason such as to widen a viewing angle of the far-infrared camera CA1 while improving mechanical characteristics. Such a configuration is preferable because far-infrared light can be efficiently collected even if an area of the transmission member 20 is small. In this case, the number of transmission members 20 having a lens shape is preferably 1 to 3, and is typically preferably 2. Furthermore, it is especially preferable that the transmission member 20 having a lens shape is aligned and modularized in advance, and integrated with a bracket or a housing that causes the far-infrared camera CA1 to adhere to the glass 1 for vehicles.

The glass 1 for vehicles according to the present embodiment is preferably configured so that an area of the opening part 19 on a surface on the vehicle interior side is smaller than the area of the opening part 19 on a surface on the vehicle exterior side, and accordingly, the transmission member 20 is preferably shaped so that an area on a surface on the vehicle interior side is smaller than an area on a surface on the vehicle exterior side. With such a configuration, strength against impact from the vehicle exterior side is improved. More specifically, in a case in which the glass 1 for vehicles according to the present embodiment is laminated glass including the glass base body 12 (vehicle exterior side) and the glass base body 14 (vehicle interior side), the opening part 19 is formed by an opening part 12*a* of the glass base body 12 and an opening part 14*a* of the glass base body 14 overlapping each other. In this case, an area of the opening part 12*a* of the glass base body 12 may be caused to be larger than an area of the opening part 14*a* of the glass base body 14, and the transmission member 20 having a size matching the opening part 12*a* of the glass base body 12 may be disposed in the opening part 12*a* of the glass base body 12.

As illustrated in FIG. 3, in the transmission member 20, a length d1 of the longest straight line among straight lines each connecting any two points within a surface on the vehicle exterior side is preferably equal to or smaller than 80 mm. The length d1 is more preferably equal to or smaller than 70 mm, and even more preferably equal to or smaller than 65 mm. Additionally, the length d1 is preferably equal to or larger than 60 mm. As illustrated in FIG. 3, in the opening part 19 of the far-infrared transmission region B, a length d2 of the longest straight line among straight lines each connecting any two points within the surface on the vehicle exterior side is preferably equal to or smaller than 80 mm. The length d2 is more preferably equal to or smaller than 70 mm, and even more preferably equal to or smaller than 65 mm. Additionally, the length d2 is preferably equal to or larger than 60 mm. It can also be said that the length d2 is a length of the longest straight line among straight lines each connecting any two points on an outer circumference of the opening part 19 on the surface on the vehicle exterior side (surface 12A) of the glass 1 for vehicles. By causing the length d1 of the transmission member 20 and the length d2 of the opening part 19 to fall within this range, lowering of the strength of the glass 1 for vehicles can be suppressed, and an amount of perspective distortion around the opening part 19 can be suppressed. Each of the lengths d1 and d2 is a length corresponding to a diameter of the surface on the vehicle exterior side in a case in which the surface on the vehicle exterior side of the transmission member 20 has a circular shape. Herein, each of the lengths d1 and d2 indicates a length in a state in which the glass 1 for vehicles is mounted on the vehicle V. For example, in a case in which the glass is subjected to bending processing to have a shape suitable for being mounted on the vehicle V, each of the lengths d1 and d2 is a length after the bending processing. The same applies to dimensions and positions in addition to the lengths d1 and d2 unless otherwise specifically noted.

(Effects)

As described above, the transmission member 20 according to the present embodiment includes the base material 30 that transmits far-infrared rays, and the first functional film 32 that is formed on the base material 30. The average transmittance of the transmission member 20 with respect to light at a wavelength from 8 μm to 12 μm is equal to or larger than 50%, and the transmittance thereof with respect to light (single wavelength light) from the laser beam source that emits light in the wavelength range from 0.8 μm to 1.8 μm is equal to or larger than 80%. The refractive index of the outermost layer 34 of the first functional film 32 with respect to light from the laser beam source (single wavelength light) is equal to or larger than 1.7.

The average transmittance of the transmission member 20 according to the present embodiment with respect to light at a wavelength from 8 μm to 12 μm is equal to or larger than 50%, and the transmittance thereof with respect to single wavelength light is equal to or larger than 80%, so that light at a wavelength from 8 μm to 12 μm and single wavelength light at a wavelength from 0.8 μm to 1.8 μm, that is, light in a plurality of wavelength ranges, can be appropriately transmitted. Furthermore, the refractive index of the outermost layer 34 of the transmission member 20 with respect to single wavelength light is equal to or larger than 1.7, which is a high refractive index with respect to single wavelength light, so that single wavelength light can be appropriately transmitted while the scratch resistance can be improved because a dense film is obtained.

The average reflectance of the transmission member 20 with respect to light at a wavelength from 8 μm to 12 μm is preferably equal to or smaller than 20%, and the reflectance thereof with respect to single wavelength light is preferably equal to or smaller than 10%. Accordingly, light at a wavelength from 8 μm to 12 μm and single wavelength light can be appropriately transmitted.

The extinction coefficient of the outermost layer 34 with respect to light at a wavelength of 10 μm is preferably equal to or smaller than 0.10, and the extinction coefficient thereof with respect to single wavelength light is preferably equal to or smaller than 0.10. Accordingly, light at a wavelength from 8 μm to 12 μm and single wavelength light can be appropriately transmitted.

The thickness D2 of the outermost layer 34 is preferably equal to or larger than 20 nm. By causing the thickness of the outermost layer 34 to fall within this range, it is possible to provide improved scratch resistance while appropriately transmitting light at a wavelength from 8 μm to 12 μm and single wavelength light.

The outermost layer 34 is preferably a layer containing $ZrO_2$ as a principal component. By causing the layer containing $ZrO_2$ as a principal component to be the outermost layer 34, it is possible to provide improved scratch resistance while appropriately transmitting light at a wavelength from 8 μm to 12 μm and single wavelength light.

The first functional film 32 preferably includes the outermost layer 34, and the contact layer 36 that is positioned on the base material 30 side with respect to the outermost layer 34 and in contact with the outermost layer 34. The refractive index of the outermost layer 34 with respect to single wavelength light is preferably higher than the refractive index of the contact layer 36 with respect to single wavelength light. That is, on the outermost side of the first functional film 32, the contact layer 36 having a low refractive index and the outermost layer 34 having a high refractive index are laminated in order from the base material 30 side. Thus, the first functional film 32 appropriately functions as an antireflection film for single wavelength light, and can improve the scratch resistance by causing the outermost layer 34 to be a dense film while appropriately transmitting single wavelength light. In the present embodiment, a sufficient antireflection function against single wavelength light can be provided by laminating the low refractive index layer and the high refractive index layer in order on the outermost side, and the scratch resistance can also be improved by causing the outermost layer 34 to be a dense high refractive index layer.

The refractive index of the contact layer 36 with respect to single wavelength light is preferably equal to or smaller than a square root of the refractive index of the base material 30 with respect to single wavelength light. By causing the refractive index of the contact layer 36 as a low refractive index layer to fall within this range, a sufficient antireflection function against single wavelength light can be provided.

The refractive index of the base material 30 with respect to single wavelength light is preferably equal to or larger than 1.8 and equal to or smaller than 4.2. By causing the refractive index of the base material 30 to fall within this range, single wavelength light can be appropriately transmitted.

The first functional film 32 preferably includes the outermost layer 34, and the intermediate layer 38 that is positioned on the base material 30 side with respect to the outermost layer 34. The intermediate layer 38 is a laminated body in which the high refractive index layer 38A and the low refractive index layer 38B are laminated in order from the base material 30 side, and the refractive index of the high refractive index layer 38A with respect to single wavelength light is preferably higher than the refractive index of the low refractive index layer 38B with respect to single wavelength light. By causing the intermediate layer 38 to be the laminated body in which the high refractive index layer 38A and the low refractive index layer 38B are laminated in order, light at a wavelength from 8 μm to 12 μm and single wavelength light can be appropriately transmitted.

The intermediate layer 38 is a laminated body in which the low refractive index layer 38B and the high refractive index layer 38A are laminated in order from the base material 30 side, and the refractive index of the high refractive index layer 38A with respect to single wavelength light is preferably higher than the refractive index of the low refractive index layer 38B with respect to single wavelength light. By causing the intermediate layer 38 to be the laminated body in which the low refractive index layer 38B and the high refractive index layer 38A are laminated in order, light at a wavelength from 8 μm to 12 μm and single wavelength light can be appropriately transmitted.

EXAMPLES

The following specifically describes the present invention with examples, but the present invention is not limited thereto. Table 1 indicates the laminating configuration of the transmission member in each example, and Table 2 indicates evaluation results of the transmission member in each example. In the examples, optical simulation was performed for the transmission member. The optical simulation was performed by using simulation software (manufactured by HULINKS Inc., TFCalc). In the examples, the optical simulation was performed assuming that an extinction coefficient k of each layer is 0 without considering wavelength dispersion of the refractive index. However, adjustment may be additionally made while considering wavelength dispersion of the refractive index and the extinction coefficient.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| 1 | Refractive index @ single wavelength | | | | | 2.20 | | | | | |
| | Film thickness | | | | | 50 | | | | | |
| 2 | Refractive index @ single wavelength | | | | 2.20 | 1.38 | | 2.20 | 2.20 | 2.20 | |
| | Film thickness | | | | 50 | 280 | | 85 | 187 | 50 | |
| 3 | Refractive index @ single wavelength | 1.38 | 2.40 | | 1.38 | 2.20 | | 1.38 | 1.38 | 1.38 | 2.20 |
| | Film thickness | 196 | 88.5 | | 120 | 68 | | 87 | 229 | 90 | 140 |
| 4 | Refractive index @ single wavelength | 1.73 | 1.38 | 2.20 | 1.73 | 1.38 | 2.40 | 2.20 | 1.73 | 1.73 | 3.60 |

TABLE 1-continued

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | Film thickness | 250 | 1200 | 320 | 125 | 334 | 300 | 137 | 73 | 108 | 310 |
| 5 | Refractive index @ single wavelength | 1.38 | 2.40 | 1.38 | 1.38 | 2.20 | 1.38 | 1.38 | 1.38 | 1.38 | 2.20 |
| | Film thickness | 392 | 688 | 393 | 386 | 68 | 388 | 356 | 226 | 342 | 280 |
| 6 | Refractive index @ single wavelength | 1.73 | 4.00 | 1.73 | 1.73 | 1.38 | 1.73 | 2.20 | 1.73 | 1.73 | 3.60 |
| | Film thickness | 250 | 156 | 125 | 250 | 334 | 125 | 274 | 146 | 216 | 310 |
| 7 | Refractive index @ single wavelength | 1.38 | 2.40 | 1.38 | 1.38 | 2.20 | 1.38 | 1.38 | 1.38 | 1.38 | 2.20 |
| | Film thickness | 392 | 52 | 386 | 386 | 68 | 386 | 356 | 226 | 342 | 280 |
| 8 | Refractive index @ single wavelength | 1.73 | 1.38 | 1.73 | 1.73 | 1.38 | 1.73 | 2.20 | 1.73 | 1.73 | 3.60 |
| | Film thickness | 125 | 136 | 125 | 125 | 167 | 125 | 137 | 73 | 108 | 155 |
| Base material | Material of base material | ZnS | Ge | ZnS | ZnS | ZnS | ZnS | Si | ZnS | ZnS | ZnS |
| | Refractive index @ single wavelength | 2.26 | 4.04 | 2.26 | 2.26 | 2.26 | 2.26 | 3.46 | 2.26 | 2.26 | 2.26 |
| | Refractive index @ 10 μm | 2.16 | 3.97 | 2.16 | 2.16 | 2.16 | 2.16 | 3.40 | 2.16 | 2.16 | 2.16 |

TABLE 2

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Base material | ZnS | Ge | ZnS | ZnS | ZnS | ZnS | Si | ZnS | ZnS | ZnS |
| Material of outermost layer | $MgF_2$ | ZnSe | $ZrO_2$ | $ZrO_2$ | $ZrO_2$ | DLC | $ZrO_2$ | $ZrO_2$ | $ZrO_2$ | $ZrO_2$ |
| Refractive index of outermost layer @ single wavelength | 1.38 | 2.40 | 2.20 | 2.20 | 2.20 | 2.40 | 2.20 | 2.20 | 2.20 | 2.20 |
| Film thickness of outermost layer (nm) | 196 | 89 | 320 | 50 | 50 | 300 | 85 | 320 | 50 | 140 |
| Average refractive index of functional film | 1.52 | 1.92 | 1.64 | 1.53 | 1.53 | 1.68 | 1.74 | 1.60 | 1.53 | 2.94 |
| Transmittance 1550 nm (%) | 100.0 | 0.0 | 100.0 | 98.7 | 97.9 | 99.8 | 100.0 | — | — | — |
| Reflectance 1550 nm (%) | 0.0 | 63.3 | 0.0 | 1.3 | 2.1 | 0.2 | 0.0 | — | — | — |
| Transmittance 905 nm (%) | — | — | — | — | — | — | — | 100.0 | — | — |
| Reflectance 905 nm (%) | — | — | — | — | — | — | — | 0.0 | — | — |
| Transmittance 1350 nm (%) | — | — | — | — | — | — | — | — | 96.8 | 99.9 |
| Reflectance 1350 nm (%) | — | — | — | — | — | — | — | — | 3.2 | 0.1 |
| Transmittance 8 to 12 μm average (%) | 96.1 | 99.0 | 92.7 | 95.9 | 95.2 | 89.6 | 76.8 | 94.7 | 96.3 | 63.3 |
| Reflectance 8 to 12 μm average (%) | 1.3 | 0.1 | 4.6 | 1.4 | 2.1 | 7.7 | 3.2 | 2.6 | 3.1 | 34.0 |

Example 1

In Example 1, used was a model of a transmission member obtained by forming functional films on both surfaces of a base material. In Example 1, target single wavelength light was set to 1550 nm, a refractive index of the base material with respect to light at a wavelength of 10 μm was set to 2.16, a refractive index thereof with respect to light at a wavelength of 1550 nm was set to 2.26, and a thickness thereof was set to 2 mm so that the base material reproduced ZnS (multi-spectral grade). By referring to Patent Literature 1, as the functional film, six layers in total were disposed in order of a high refractive index layer (MgO), a low refractive index layer ($MgF_2$), a high refractive index layer . . . from the base material side, and the low refractive index layer was caused to be an outermost layer. Refractive indexes and thicknesses of the high refractive index layer, the low refractive index layer, and the base material were indicated in Table 1.

Example 2

In Example 2, the refractive index of the base material with respect to light at a wavelength of 10 μm was set to 3.97, the refractive index thereof with respect to light at a wavelength of 1550 nm was set to 4.04, and the thickness thereof was set to 5 mm so that the base material reproduced Ge. Example 2 is different from Example 1 in that, by referring to the first embodiment of Patent Literature 2, six layers in total were disposed in order of the low refractive index layer ($YbF_3$), the high refractive index layer (ZnSe), the high refractive index layer (Ge), the high refractive index layer (ZnSe), the low refractive index layer ($YbF_3$), and the high refractive index layer (ZnSe) from the base material side, and the high refractive index layer (ZnSe) was caused to be the outermost layer. Refractive indexes and thicknesses of the high refractive index layer, the low refractive index layer, and the base material in Example 2 were indicated in Table 1.

Example 3

Example 3 is different from Example 1 in that five layers in total were disposed in order of the high refractive index layer, the low refractive index layer, the high refractive index layer . . . from the base material side, and the high refractive index layer ($ZrO_2$) was caused to be the outermost layer. Refractive indexes and thicknesses of the high refractive index layer, the low refractive index layer, and the base material in Example 3 were indicated in Table 1.

Example 4

Example 4 is different from Example 1 in that seven layers in total were disposed in order of the high refractive index layer, the low refractive index layer, the high refractive index layer . . . from the base material side, and the high refractive index layer ($ZrO_2$) was caused to be the outermost layer. Refractive indexes and thicknesses of the high refractive index layer, the low refractive index layer, and the base material in Example 4 were indicated in Table 1.

Example 5

Example 5 is different from Example 1 in that the high refractive index layer was made of $ZrO_2$, eight layers in total were disposed in order of the low refractive index layer, the high refractive index layer, the low refractive index layer . . . from the base material side, and the high refractive index layer was caused to be the outermost layer. Refractive indexes and thicknesses of the high refractive index layer, the low refractive index layer, and the base material in Example 5 were indicated in Table 1.

Example 6

Example 6 is different from Example 1 in that five layers in total were disposed in order of the low refractive index layer, the high refractive index layer, the low refractive index layer, . . . from the base material side, and the high refractive index layer (DLC) was caused to be the outermost layer. Refractive indexes and thicknesses of the high refractive index layer, the low refractive index layer, and the base material in Example 6 were indicated in Table 1.

Example 7

In Example 7, the refractive index of the base material with respect to light at a wavelength of 10 μm was set to 3.40, the refractive index thereof with respect to light at a wavelength of 1550 nm was set to 3.46, and the thickness thereof was set to 2 mm so that the base material reproduced Si (FZ grade). Example 7 is different from Example 1 in that the high refractive index layer was made of $ZrO_2$, seven layers in total were disposed in order of the high refractive index layer, the low refractive index layer, the high refractive index layer . . . from the base material side, and the high refractive index layer was caused to be the outermost layer. Refractive indexes and thicknesses of the high refractive index layer, the low refractive index layer, and the base material in Example 7 were indicated in Table 1.

Example 8

Example 8 is different from Example 1 in that target single wavelength light was set to 905 nm, seven layers in total were disposed in order of the high refractive index layer, the low refractive index layer, the high refractive index layer . . . from the base material side, and the high refractive index layer ($ZrO_2$) was caused to be the outermost layer. Refractive indexes and thicknesses of the high refractive index layer, the low refractive index layer, and the base material in Example 8 were indicated in Table 1.

Example 9

Example 9 is different from Example 1 in that target single wavelength light was set to 1350 nm, seven layers in total were disposed in order of the high refractive index layer, the low refractive index layer, the high refractive index layer, . . . from the base material side, and the high refractive index layer ($ZrO_2$) was caused to be the outermost layer. Refractive indexes and thicknesses of the high refractive index layer and the low refractive index layer in Example 9 were indicated in Table 1.

Example 10

Example 10 is different from Example 1 in that target single wavelength light was set to 1550 nm, six layers in total were disposed in order of the high refractive index layer (Si), the high refractive index layer ($ZrO_2$), the high refractive index layer (Si), the high refractive index layer ($ZrO_2$), . . . from the base material side, and the high refractive index layer ($ZrO_2$) was caused to be the outermost layer. Refractive indexes and thicknesses of the high refractive index layer in Example 10 were indicated in Table 1.

For the transmission member in each example, the scratch resistance of the outermost layer, the transmittance and the reflectance of the transmission member with respect to light at 1550 nm, 905 nm, or 1350 nm, and the average transmittance and the average reflectance of the transmission member with respect to light at 8 μm to 12 μm were calculated by simulation.

Figure 8:
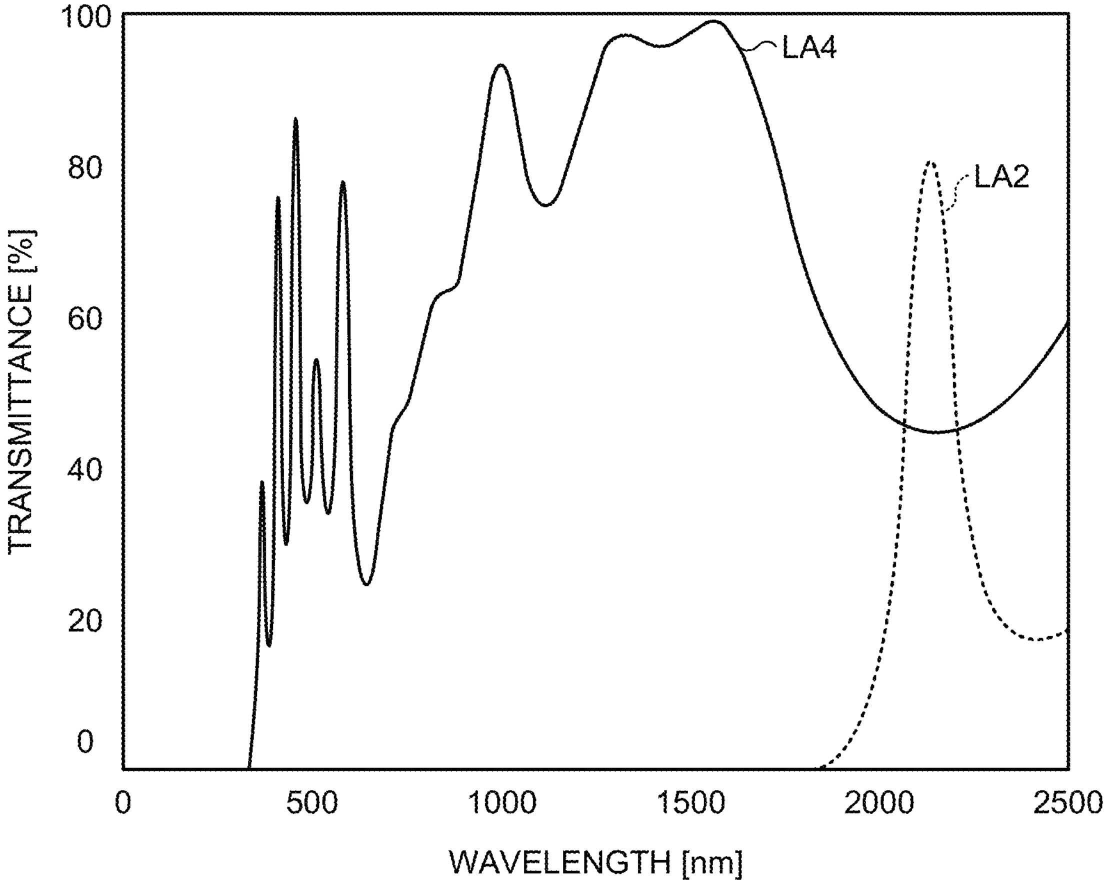
FIG. 8 is a graph indicating simulation results of visible and near-infrared transmission spectra in Example 2 and Example 4.
Figure 9:
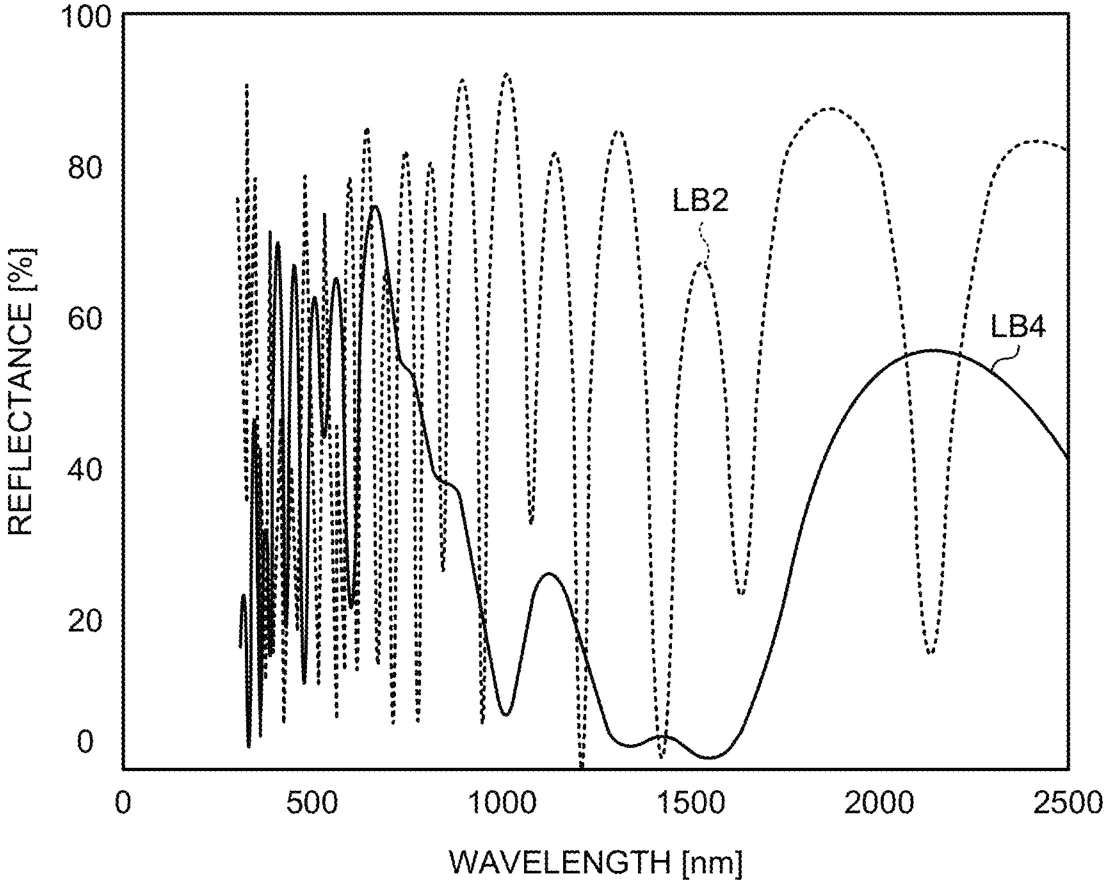
FIG. 9 is a graph indicating simulation results of visible and near-infrared reflection spectra in Example 2 and Example 4.
Figure 10:
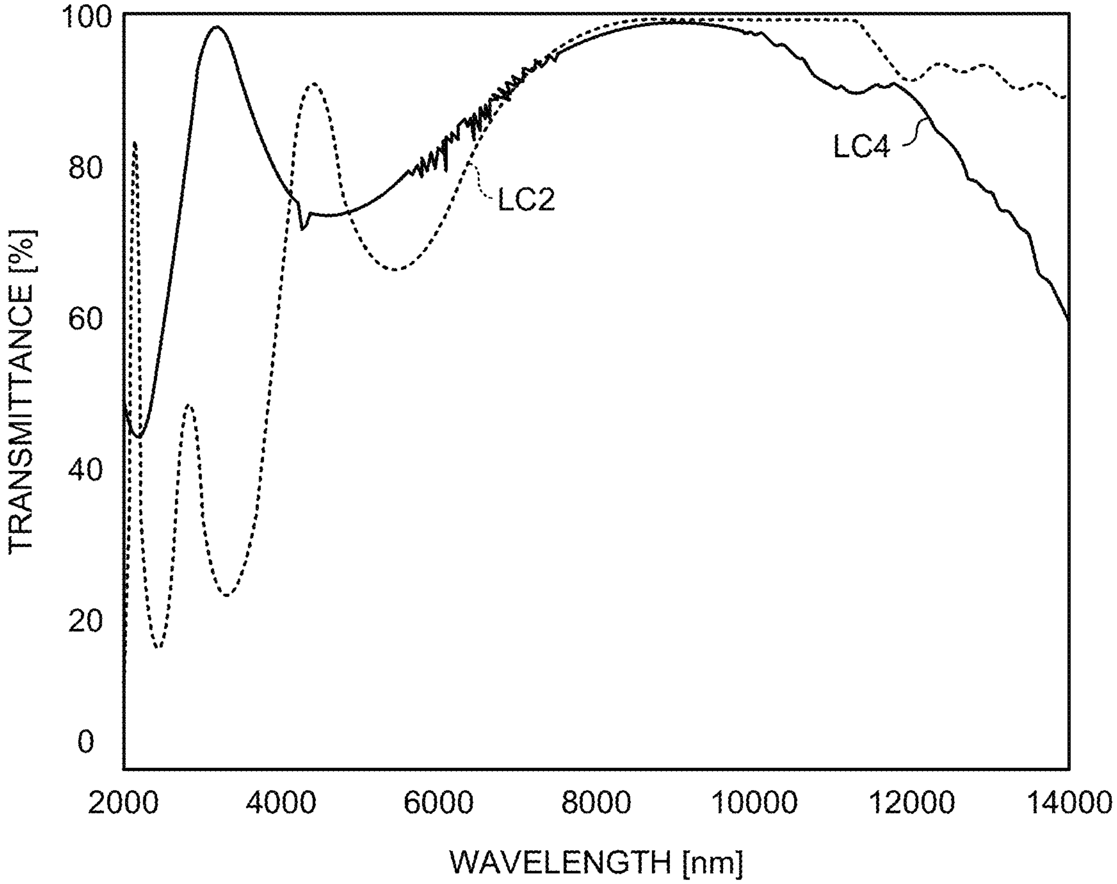
FIG. 10 is a graph indicating simulation results of a far-infrared transmission spectrum in Example 2 and Example 4.
Figure 11:
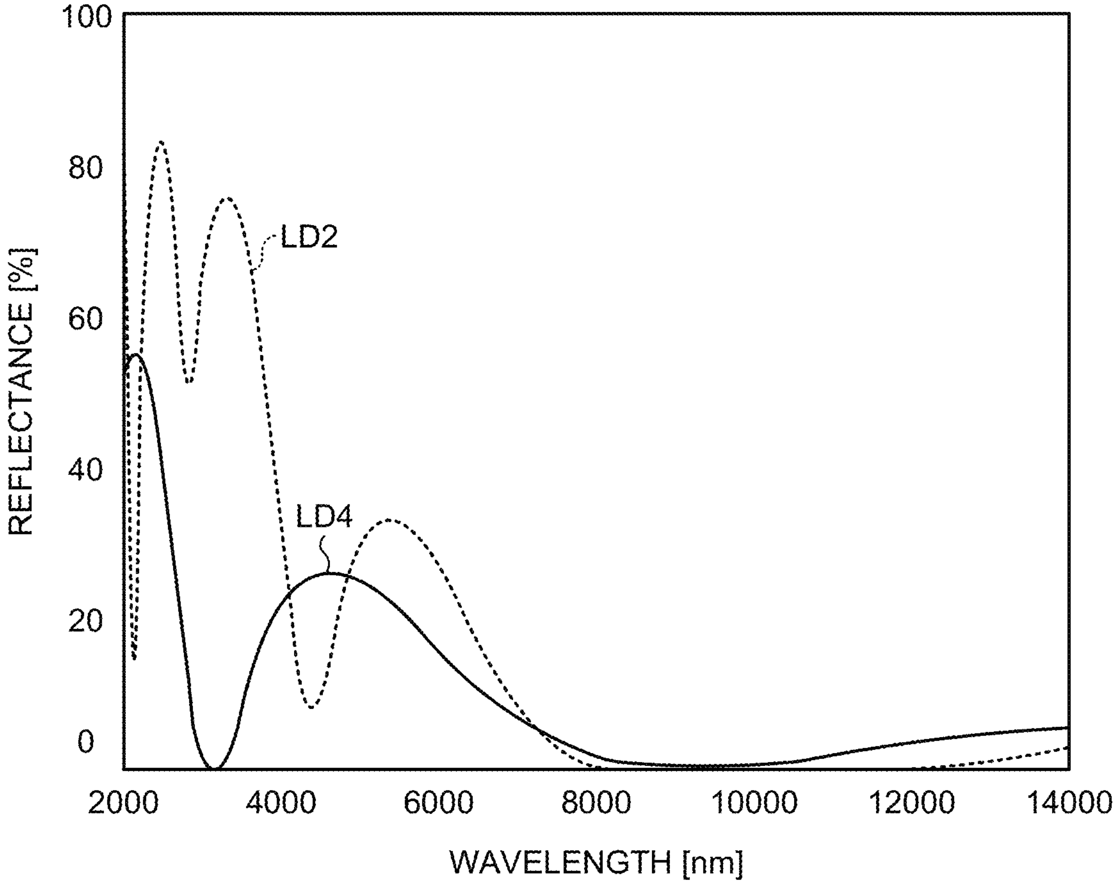
FIG. 11 is a graph indicating simulation results of a far-infrared reflection spectrum in Example 2 and Example 4.

The reflectance and the transmittance of the transmission member with respect to light at each wavelength were calculated by simulation software (manufactured by HULINKS Inc., TFCalc). FIG. 8 is a graph indicating simulation results of visible and near-infrared transmission spectra in Example 2 and Example 4, FIG. 9 is a graph indicating simulation results of visible and near-infrared transmission spectra in Example 2 and Example 4, FIG. 10 is a graph indicating simulation results of a far-infrared transmission spectrum in Example 2 and Example 4, and FIG. 11 is a graph indicating simulation results of a far-infrared reflection spectrum in Example 2 and Example 4. In FIG. 8 to FIG. 11, lines LA2, LB2, LC2, and LD2 indicate results of Example 2, and lines LA4, LB4, LC4, and LD4 indicate results of Example 4.

Regarding each example, Table 2 indicates the material of the base material simulated by simulation, the material of the outermost layer simulated by simulation, the refractive index of the outermost layer with respect to single wavelength light, the film thickness of the outermost layer, the average refractive index of the functional film (corresponding to the average refractive index of the first functional film 32 described in the present embodiment), the transmittance and the reflectance with respect to target single wavelength light, and the average transmittance and the average reflectance with respect to light at 8 μm to 12 μm.

As indicated by Table 2, in Example 1 as a comparative example, the refractive index of the outermost layer is smaller than 1.7, so that the scratch resistance is estimated to be low. In Example 2 as a comparative example, it can be found that the refractive index of the outermost layer is equal to or larger than 1.7, but the transmissivity with respect to light at 1550 nm is low. On the other hand, in Example 3 to Example 10 as embodiments, the refractive index of the outermost layer is equal to or larger than 1.7, the transmittance with respect to light at 1550 nm, 905 nm, or 1350 nm is equal to or larger than 80%, and the average transmittance with respect to light at 8 μm to 12 μm is equal to or larger than 50%, so that it can be found that a high durability film that can transmit light in a plurality of wavelength ranges and has high scratch resistance can be applied.

The embodiment of the present invention has been described above, but the embodiment is not limited to the content thereof. The components described above include a component that is easily conceivable by those skilled in the art, substantially the same component, and what is called an equivalent. Furthermore, the components described above can also be appropriately combined with each other. In addition, the components can be variously omitted, replaced, or modified without departing from the gist of the embodiment described above.

REFERENCE SIGNS LIST

1 GLASS FOR VEHICLES
10, 12, 14 GLASS BASE BODY
20 TRANSMISSION MEMBER
30 BASE MATERIAL
32 FIRST FUNCTIONAL FILM (FUNCTIONAL FILM)
34 OUTERMOST LAYER
36 CONTACT LAYER
38 INTERMEDIATE LAYER
38A HIGH REFRACTIVE INDEX LAYER
38B LOW REFRACTIVE INDEX LAYER

The invention claimed is:

1. A transmission member comprising:

a base material that transmits far-infrared rays; and a functional film that is formed on the base material, wherein average transmittance with respect to light at a wavelength from 8 μm to 12 μm is equal to or larger than 50%, transmittance with respect to light from a laser beam source that emits light in a wavelength range from 0.8 μm to 1.8 μm is equal to or larger than 80%, and a refractive index of an outermost layer of the functional film with respect to light from the laser beam source is equal to or larger than 1.7.

2. The transmission member according to claim 1, wherein average reflectance with respect to light at a wavelength from 8 μm to 12 μm is equal to or smaller than 20%, and reflectance with respect to light from the laser beam source is equal to or smaller than 10%.

3. The transmission member according to claim 1, wherein an extinction coefficient of the outermost layer with respect to light at a wavelength of 10 μm is equal to or smaller than 0.10, and an extinction coefficient with respect to light from the laser beam source is equal to or smaller than 0.10.

4. The transmission member according to claim 1, wherein a thickness of the outermost layer is equal to or larger than 20 nm.

5. The transmission member according to claim 1, wherein the outermost layer is a layer containing $ZrO_2$ as a principal component.

6. The transmission member according to claim 1, wherein the functional film includes the outermost layer, and a contact layer that is positioned on the base material side with respect to the outermost layer and in contact with the outermost layer, and a refractive index of the outermost layer with respect to light from the laser beam source is higher than a refractive index of the contact layer with respect to light from the laser beam source.

7. The transmission member according to claim 1, wherein the functional film includes the outermost layer, and a contact layer that is positioned on the base material side with respect to the outermost layer and in contact with the outermost layer, and a refractive index of the contact layer with respect to light from the laser beam source is equal to or smaller than a square root of a refractive index of the base material with respect to light from the laser beam source.

8. The transmission member according to claim 1, wherein a refractive index of the base material with respect to light from the laser beam source is equal to or larger than 1.8 and equal to or smaller than 4.2.

9. The transmission member according to claim 1, wherein the functional film includes the outermost layer, and an intermediate layer that is positioned on the base material side with respect to the outermost layer, and the intermediate layer is a laminated body in which a high refractive index layer and a low refractive index layer are laminated in order from the base material side, and a refractive index of the high refractive index layer with respect to light from the laser beam source is higher than a refractive index of the low refractive index layer with respect to light from the laser beam source.

10. The transmission member according to claim 1, wherein the functional film includes the outermost layer, and an intermediate layer that is positioned on the base material side with respect to the outermost layer, and the intermediate layer is a laminated body in which a low refractive index layer and a high refractive index layer are laminated in order from the base material side, and a refractive index of the high refractive index layer with respect to light from the laser beam source is higher than a refractive index of the low refractive index layer with respect to light from the laser beam source.

11. The transmission member according to claim 1, wherein an average refractive index of the functional film with respect to light at a wavelength of 10 μm is equal to or larger than 1.3 and equal to or smaller than 2.5.

12. The transmission member according to claim 1, mounted on a vehicle.

13. The transmission member according to claim 12, disposed on a window member of the vehicle.

14. The transmission member according to claim 12, disposed on an exterior member for pillars of the vehicle.

15. The transmission member according to claim 12, disposed in a light blocking region of an exterior member for vehicles.

* * * * *